United States Patent [19]

Ogino et al.

[11] Patent Number: 5,039,923
[45] Date of Patent: Aug. 13, 1991

[54] FOCUS ADJUSTING DEVICE FOR PROJECTION DISPLAY

[75] Inventors: Masanori Ogino; Takeo Yamada; Miyuki Ikeda; Ichiro Niitsu, all of Yokohama, Japan

[73] Assignee: Hitachi, Ltd., Tokyo, Japan

[21] Appl. No.: 422,576

[22] Filed: Oct. 17, 1989

[30] Foreign Application Priority Data

Oct. 19, 1988 [JP] Japan ................................. 63-261478
Jan. 13, 1989 [JP] Japan ..................................... 1-4964

[51] Int. Cl.5 ........................ G09G 1/04; H01J 29/58; H01J 29/46
[52] U.S. Cl. .................................. 315/382; 313/442
[58] Field of Search ........................... 315/382, 382.1; 313/442, 437; 335/210

[56] References Cited

U.S. PATENT DOCUMENTS 3,504,211 3/1970 Takemoto et al. .................. 313/437
4,249,112 3/1981 McKibben ........................... 315/382
4,799,000 1/1989 Close ................................... 315/371

FOREIGN PATENT DOCUMENTS 0008833 1/1986 Japan ................................... 315/382
831943 4/1960 United Kingdom ................ 315/382

OTHER PUBLICATIONS

"Television Engineering Handbook", Edited by Donald G. Fink, copyright ©1957, by McGraw-Hill Book Company, Inc.
Kanaya et al., "A Method of Correcting the Distorted Spot Shape of a Deflected Electron Probe by Means of Dynamic Focusing and Stigmator", J. Phys. E: Sci. Instrum., vol. 13, #4, Apr., 1980.
Bulyginskii et al., "Two Channel Oscilloscope Indicator with High Resolution for the Investigation of Random Processes", Instrum. and Exp. Tech. (U.S.A.), No. 3, (May–June, 1970).

Primary Examiner—Gregory C. Issing
Attorney, Agent, or Firm—Antonelli, Terry, Stout & Kraus

[57] ABSTRACT

A focus adjusting device for projection display, comprising at least one set of 4-pole magnetic field generating means, and adjustment means for adjusting the magnetic field strength of the 4-pole magnetic field generating means so as to eliminate astigmatism caused by fabrication error and attachment error of an electron gun and a focus coil.

12 Claims, 11 Drawing Sheets

FIG. 6A
FIG. 6B
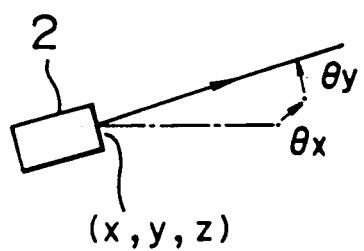
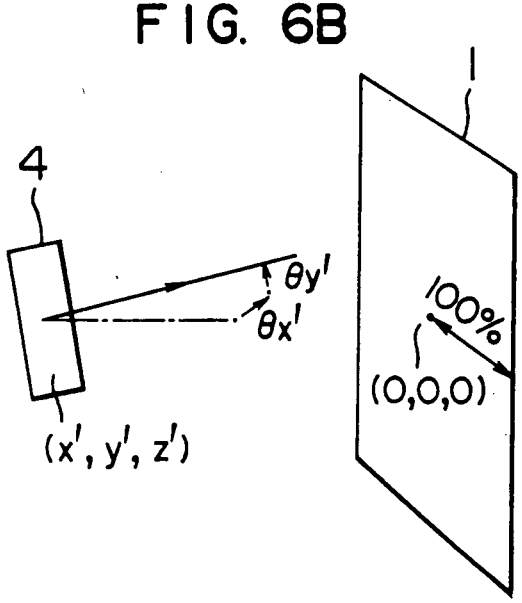
FIG. 7
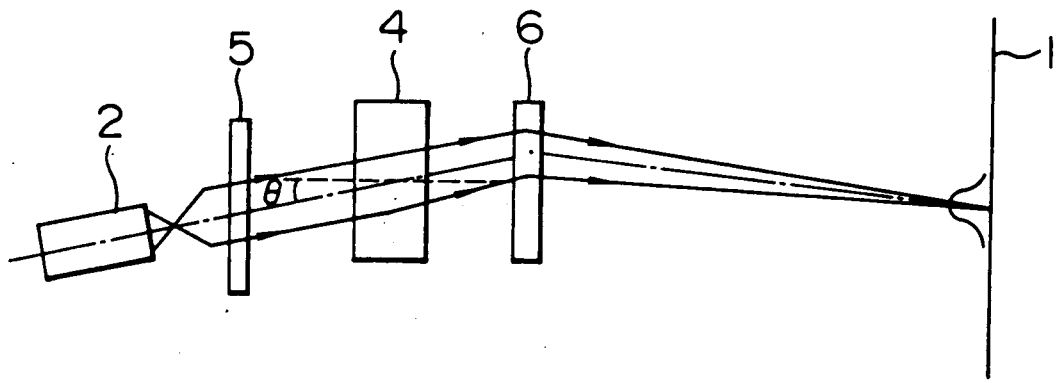
FIG. 8
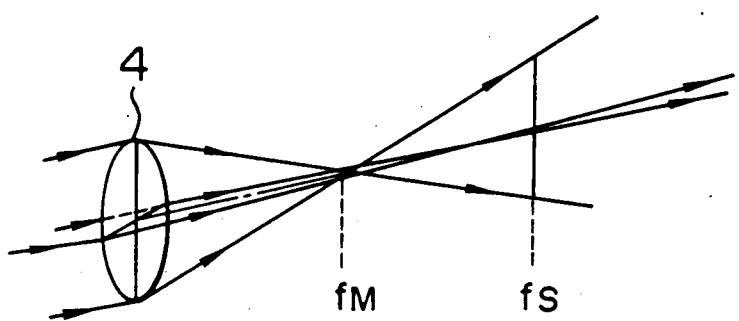

FIG. 16
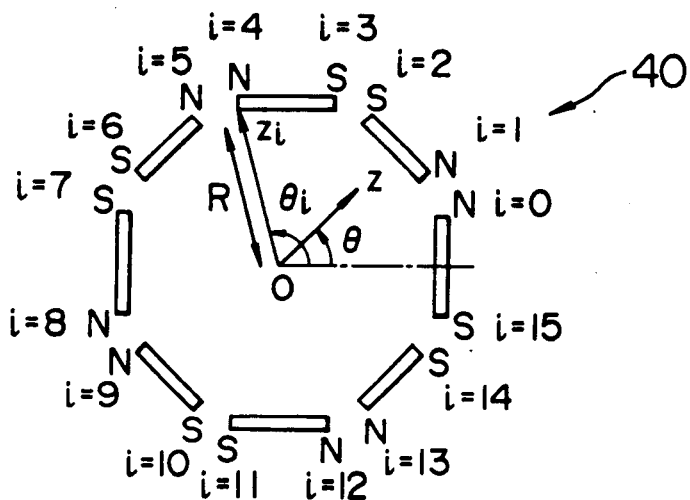
FIG. 17A
FIG. 17B
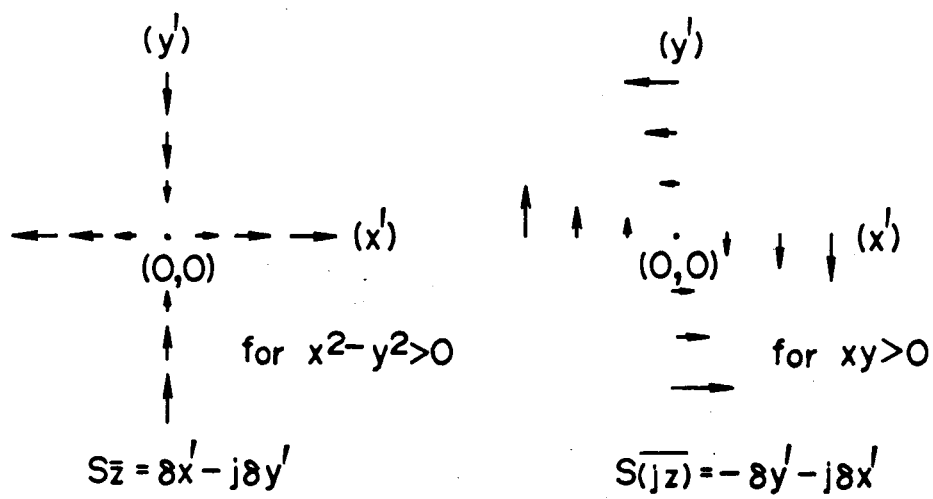
FIG. 18
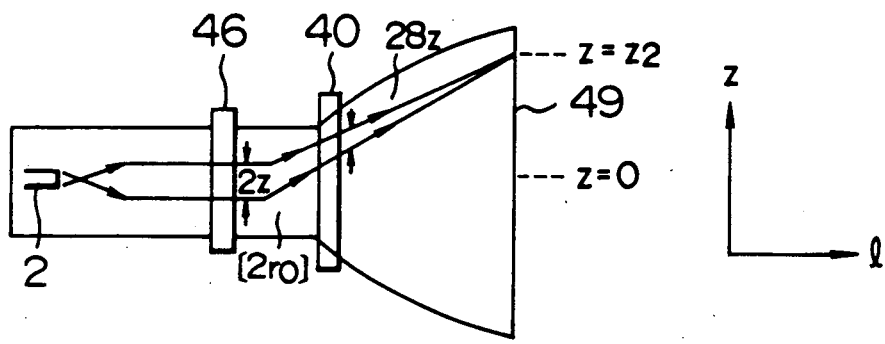

FOCUS ADJUSTING DEVICE FOR PROJECTION DISPLAY

BACKGROUND OF THE INVENTION

The present invention relates to a focus adjusting device facilitating adjustment of projection display images with high definition.

FIG. 1 is a configuration diagram showing arrangement of a CRT (cathode ray tube) of an electromagnetically focusing CRT display of the prior art and its peripheral components. Numeral 1 denotes a CRT face, 2 an electron gun, 3 a deflection coil, 4 an electromagnetic focus coil, 5 and 6 magnets each having two poles (N and S). By slightly rotating the magnets 5 and 6 in a plane perpendicular to the tube axis, the strength and direction of the magnetic field can be adjusted.

In FIG. 1, the bipolar magnet 5 is provided for absorbing dispersion in the direction of electrons emitted from the electron gun 2 and for making the electrons pass through the center of the focus coil 4 on the basis of Lorentz's law. The focus coil 4 forms a magnetic field of approximately 300 Gauss nearly in parallel to the tube axis to focus an electron beam. The bipolar magnet 6 is provided for absorbing dispersion in the direction of electrons outputted from the focus coil 4 and for making the electrons strike against the center of the CRT face 1 (in the undriven state of the deflection coil).

In a high definition projection display apparatus using a projection CRT as the CRT, a deflection yoke of the uniform magnetic field type is used. In that case the, sine of the deflection angle is proportionate to the deflection current in accordance with track physics of the electron beam. On the other hand, the deflection distance on the screen is proportionate to the tangent of the deflection angle because the fluorescent screen of the CRT is nearly planar. In case the deflection current has a distortion less sawtooth waveform, therefore, geometric distortion is caused on the screen. That is to say, the electron beam at the peripheral part of the screen is overdeflected in a peripheral radial direction in proportion to the cube of the deflection angle. These distortions are classified into so-called pincushion distortion (hereafter referred to as pin distortion as well) and S distortion, which are corrected by various well-known means, respectively.

Such an apparatus is described in D. G. Fink, Television Engineering Handbook, McGraw-Hill Book Company, Inc. (1957) pp. 6–58 to 6–62 and pp. 16–195 to 16–196. However, this is a technique of absorbing the aberration by moving a pole piece of the focus coil 4 slightly and mechanically. Extremely delicate adjustment work is thus required, resulting in industrial difficulty.

In the above described prior art, either means for making a correcting current flow through the deflection coil, or a method of disposing four magnets or electromagnets in the deflection yoke output section of the CRT funnel is adopted to correct the pincushion distortion.

Although theoretical analysis of the principle of the former means has been sufficiently performed, the former means has a problem that a large amount of electric power is required to make the correcting current flow.

The latter means has a simple configuration, and its cost is low. Since the theoretical analysis of its principle has not been sufficiently performed yet, however, the latter means depends a trial-and-error technique. In addition, it is difficult to correct pincushion distortion properly. Thus, the latter means has a problem that complicated image distortion remains. Further, the latter means deteriorates electron beam focusing, and means for correcting focus deterioration caused by magnets is not disclosed in the prior art. In applications wherein focus performance is regarded as important, therefore, the magnet correction scheme has not been used.

Further, the above described technique has a problem that it is difficult to reduce aberration caused by dispersion in component dimensions.

In the conventional method heretofore described, a bipolar magnet is rotated and adjusted slightly in a plane nearly perpendicular to the transit direction of the electrons to remove aberration of the electron beam. It is thus necessary to rotate and adjust the bipolar magnet while carefully observing the in-focus situation of the display image. Further, it is necessary to disposed a large mirror so as to be opposed to the display screen in order to observe the display screen. When the conventional method is used, the adjustment work itself is thus difficult to do.

SUMMARY OF THE INVENTION

A first object of the present invention is to provide a focus adjusting device cleared of a problem caused when astigmatism generated by fabrication error and attachment error of an electron gun and a focusing electron lens is to be eliminated by using the above described bipolar magnet, i.e., a problem that it is difficult to rotate and adjust the bipolar magnet.

A second object of the present invention is to provide a focus adjusting device of magnet type which is excellent in principle and which leaves only a slight image distortion by theoretically and quantitatively elucidating physics of correction which is performed by using magnets.

A third object of the present invention is to provide a focus adjusting device performing suitable defocus correction by quantitatively elucidating physics of electron beam defocusing using magnets so that pincushion distortion correction using magnets may also be applied to application fields where focusing performance is regarded as important.

The above described first object is achieved by providing two sets of four-pole aberration correcting coil means disposed adjacent to the focus coil and two sets of adjustable power supply means for exciting the four-pole aberration correcting coil means.

The above described second object is achieved by using 16-pole magnet means comprising 8 magnets symmetrically disposed instead of using the conventional configuration comprising 4 magnets.

Further, the third object of the present invention is achieved by using 8-pole dynamic focus coil means, amplifier means and correction waveform generation means.

In the above described two sets of 4-pole aberration correcting coil means, magnetic fields formed respectively by the above described adjustable power supply means are controlled in two-dimensional degree of freedom by the adjustable power supply means, thus the direction and strength of a resultant compound 4-pole magnetic field. A principal part of aberration generated in proportion to square of attachment angle of the electron gun is corrected by the compound magnetic field. On the other hand, two-pole adjustable magnet means already existing in the input side of the focus coil means is so adjusted as to correct a principal part of aberration generated in proportion to the first power of the attachment angle of the electron gun. By the above described bipolar magnet field and the above described compound 4-pole magnetic field, therefore, principal aberrations caused by dispersion in attachment angle are corrected.

Further, the 16-pole magnet means comprising 8 magnets is disposed in the deflection yoke output section of the CRT funnel and generates a magnetic field distribution matched to pincushion distortion correction defined by physics of electron beam track.

Therefore, pincushion distortion is corrected.

Further, defocus caused by magnetic field distribution is shown to be astigmatism distortion expressed by a quadratic function of positional coordinates on the screen. Therefore, defocus can be corrected by the 8-pole dynamic focus coil means, the correction waveform generating means for generating the above described second-order function, and the amplifier means for amplifying the second order function and driving the focus coil.

BRIEF DESCRIPTION OF THE DRAWINGS

FIGS. 6A and 6B are diagrams for explaining dispersion in dimensions incurred in an electron gun and a focus coil, respectively;

FIG. 7 is a diagram for explaining the path of an electron beam;

FIG. 8 is a diagram for explaining astigmatism of the electron beam;

FIG. 16 is a sectional view of a 16-pole magnet group shown in FIG. 11;

FIGS. 17A and 17B are diagrams for explaining defocus interference of magnets;

FIG. 18 is a diagram for explaining expansion of an electron beam;

DESCRIPTION OF THE PREFERRED EMBODIMENTS

Figure 1:
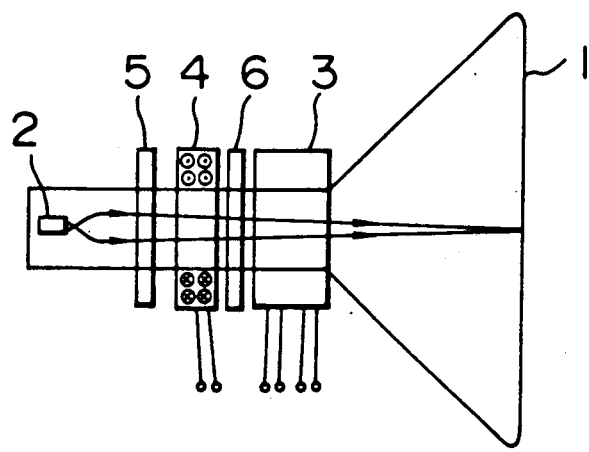
FIG. 1 is a schematic configuration diagram showing a conventional focus adjusting device.

Embodiments of the present invention will now be described by referring to drawings. In the following drawings, components equivalent to those of FIG. 1 are denoted by like numerals.

Figure 2:
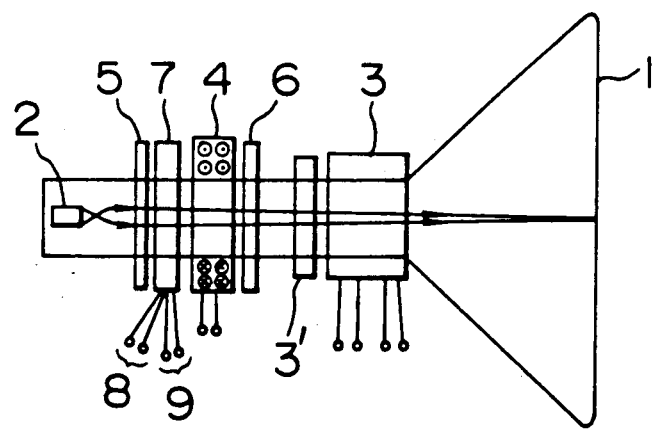
FIG. 2 is a schematic configuration diagram of a focus adjusting device for projection display showing an embodiment of the present invention.

FIG. 2 is a configuration diagram for explaining a first embodiment of the present invention. Numeral 1 denotes a CRT face, 2 an electron gun, 3 a deflection coil, 4 a focus coil, and 5 and 6 bipolar magnets. These components of FIG. 1 are denoted by like numerals. Further, numeral 3' denotes an auxiliary deflection coil and numeral 7 denotes an aberration correcting coil comprising two sets of 4-pole aberration correcting coil means. Numerals 8 and 9 denote input terminals of the aberration correcting coil means.

Figure 3:
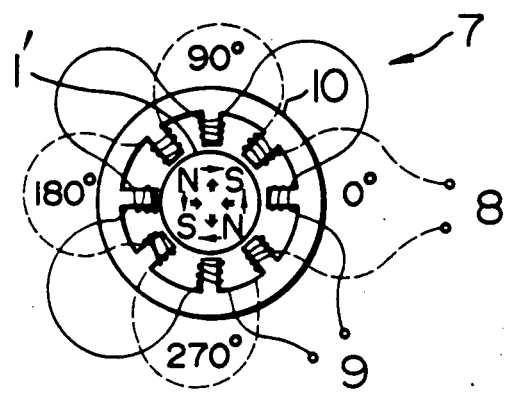
FIG. 3 is a detailed configuration diagram of an aberration correcting coil shown in FIG. 2.

FIG. 3 is a detailed configuration diagram of the aberration correcting coil shown in FIG. 2. FIG. 3 is a view seen from the electron gun 2 side. Numeral 10 denotes a core comprising a magnetic material. (Typically, ferrite is used as the core.) A circle located at the central portion of FIG. 3 represents the neck section of the CRT. Thin arrows depicted inside the center circle represent directions of the 4-pole magnetic field formed by a current flowing through a winding 8 represented by broken lines. In addition, thick arrows represent directions in which respective portions of expansion of the electron beam undergo auxiliary deflection.

In FIG. 3, astigmatism in the horizontal/vertical direction is intentionally caused by the above described 4-pole magnetic field.

By astigmatism thus intentionally formed by the 4-pole magnetic field, astigmatism caused by fabrication error (dispersion), attachment error (dispersion) and the like of the electron gun and the focus coil itself is adjusted and modified. As a result, images completely cleared of astigmatism are eventually obtained.

Figure 9A:
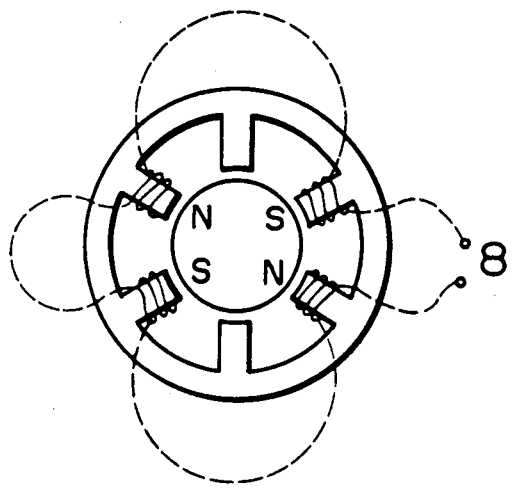
FIGS. 9A, 9B and 10 are configuration diagrams showing other examples of an aberration correcting coil wound around a 6-pole core.
Figure 9B:
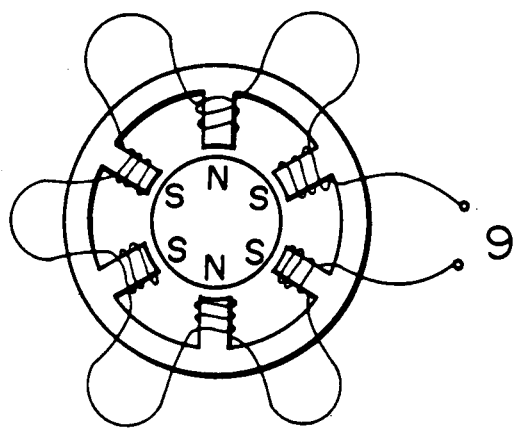

The aberration correcting coil 7 can be disposed in front of the focus coil or behind the focus coil. Further, an auxiliary deflection coil 3' may also serve as the aberration correcting coil 7. A 6-pole pole piece (as shown in FIGS. 9A and 9B) can be used as the auxiliary deflection coil 3' (for convergence correction).

A current flowing through a winding 9 represented by a solid line generates a magnetic field distribution obtained by rotating the magnetic field distribution of FIG. 3 by just 45 degrees. These two sets of magnetic fields are composed with respective strengths changed, one compound 4-pole magnetic field in an arbitrary slant direction being thus formed.

Figure 4A:
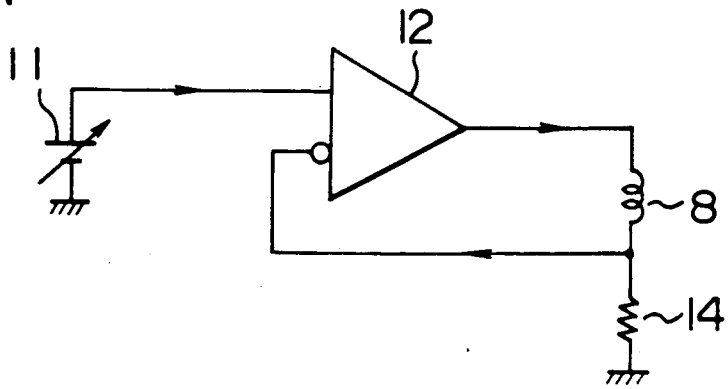
FIGS. 4A and 4B are circuit configuration diagrams of a drive circuit of the aberration correcting coil.
Figure 4B:
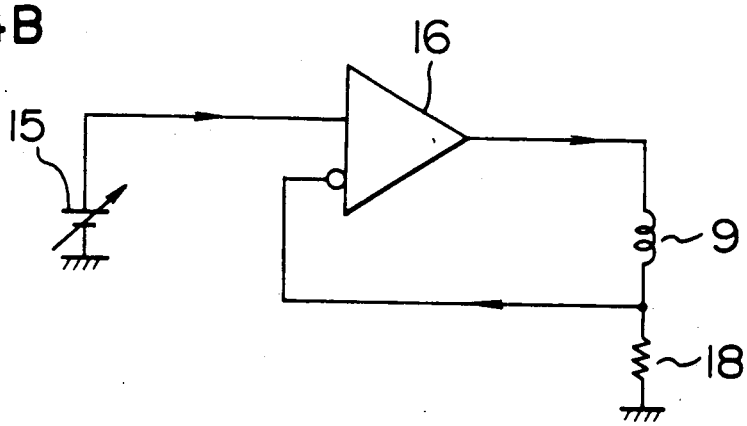

FIGS. 4A and 4B are configuration diagrams of a drive circuit for the aberration correcting coil 7 shown in FIG. 3. Numerals 11 and 15 denote power supplies yielding adjustable voltage. Numerals 12 and 16 denote negative-feedback amplifiers. Numerals 8 and 9 denote correcting coils respectively corresponding to the correcting coils 8 and 9 of FIGS. 2 and 3. Numerals 14 and 18 denote resistors for detecting currents flowing through the correcting coils 8 and 9, respectively. Detected voltages are fed back to respective feedback amplifiers 12 and 16 to perform stabilization control of those currents.

Figure 5:
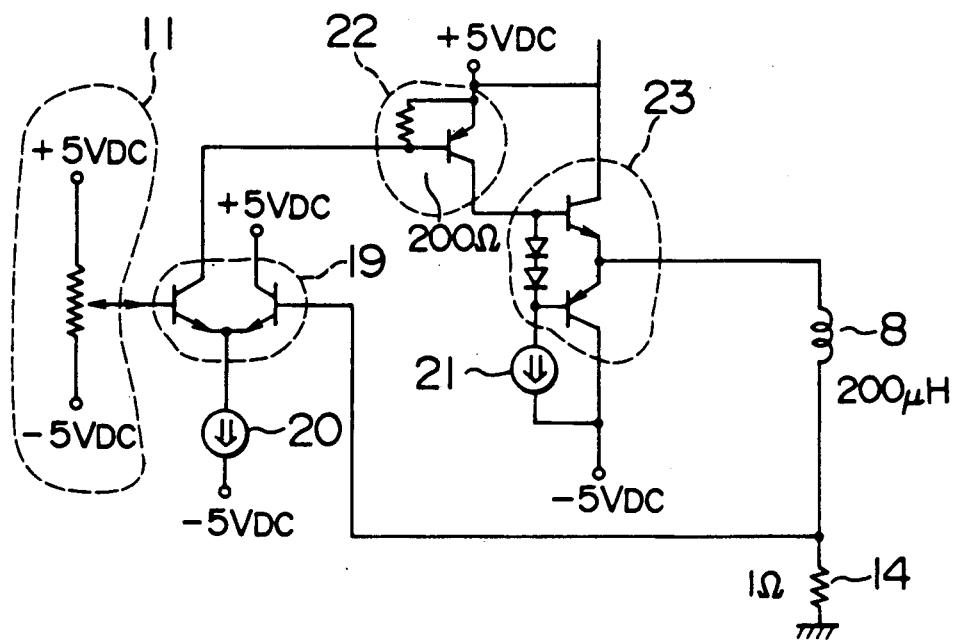
FIG. 5 is a circuit configuration diagram of a negative-feedback amplifier shown in FIGS. 4A and 4B.

FIG. 5 is a circuit configuration diagram of the negative-feedback amplifiers shown in FIGS. 4A-4B. Numerals 8, 11 and 14 denote the same components as those denoted by like numerals in FIGS. 4A-4B. Numeral 19 denotes a differential amplifier, 20 a current source of approximately 6 mA, 21 a current source of approximately 20 mA, 22 a common-emitter amplifier, and 23 a push-pull amplifier.

A negative-feedback loop is formed by phase inverting action of the common-emitter amplifier 22.

Operation performed in the above described configuration so as to correct a principal part of aberration generated in the focus coil 4 as a result of dispersion (error) in attachment angle or the like of the electron gun 2 will hereafter be described.

FIGS. 6A and 6B are diagrams for explaining dimension dispersion of the electron gun 2 and the focus coil 4. Numeral 1 denotes a CRT face. At the center of the CRT face 1, an origin having coordinates (x, y, z) is set, and its half screen width is defined as 100%. In FIG. 6A, numeral 2 denotes an electron gun, which has 5-dimensional dispersion in total comprising 3-dimensional position dispersion (x, y, z) and 2-dimensional direction dispersion ($\theta x$, $\theta y$). In FIG. 6B, dispersion of the focus coil 4 is also 5-dimensional as represented by (x', y', z') and ($\theta'x$, $\theta'y$). Among these, dispersion in two dimensions of z and z' can be absorbed by adjusting a current flowing through the focus coil to adjust the focusing power of an electromagnetic lens. Further, dispersions in four dimensions of ($\theta'x$, $\theta'y$) and (x', y') can be absorbed by using the adjustable bipolar magnet 6 shown in FIG. 2. Remaining dispersion factors are 4-dimensional as represented by (x'-x, y'-y) and ($\theta'x-\theta x$, $\theta'y-\theta y$). Among them, two dimensions (x'x, y'-y) are absorbed by using the adjustable bipolar magnet 5 as shown in FIG. 2.

FIG. 7 is a diagram for explaining the path of the electron beam. The center of the electron beam passes through nearly the center of the magnetic field of the focus coil. However, the axis of the course of the electron beam forms a finite tilt angle $\theta$ with respect to the axis of the above described magnetic field.

The electromagnetic lens formed by the focus coil 4 has aberration proportionate to the odd number-th power of this tilt angle $\theta$ and aberration proportionate to the even number-th power of the tilt angle $\theta$. Principal aberration proportionate to the odd number-th power of the tilt angle is comatic aberration. The comatic aberration can be minimized by making the electron beam pass through nearly the center of the electromagnetic lens by means of the adjustable means 5. As its adjustment means, the current flowing through the focus coil 4 is increased or decreased to increase or decrease the power of the electromagnetic lens. And the adjustable bipolar magnet is so adjusted that the average position of the spot size may not be displaced even if the spot size on the screen is changed as a result of increase or decrease in power of the electromagnetic lens.

On the other hand, principal aberrations proportionate to the even-numbered powers of the tilt angle $\theta$ are classified into spherical aberration proportionate to the zeroth power of the tilt angle and astigmatism proportionate to the second power of the tilt angle.

The spherical aberration is an initial element mainly defined by the electrode shape and the potential distribution of the electron gun and is not the subject of the present invention.

Astigmatism is the subject of the present invention. Astigmatism having a mode as shown in FIG. 8 is generated. That is to say, a focusing point $f_M$ of the meridional beam is different from a focusing point $f_s$ of the sagittal beam in this form.

When only one component included in components ($\theta'x-\theta x$, $\theta'y-\theta y$) is dominant, the astigmatism is corrected by the magnetic field which is generated by the coil represented by broken lines in FIG. 3. Further, when the x component is nearly equivalent in amplitude to the y component, that astigmatism is corrected by the coil represented by the solid line in FIG. 3.

In FIG. 2, the adjustable bipolar magnet 5 is shown as a component different from the aberration correcting coil 7. However, it is also possible to fabricate the bipolar magnet as an electromagnetic coil and form it integrally as two more different windings wound around a part of the 8-pole core of FIG. 3. By doing so, the focus adjustment process is extremely facilitated and quickened in application to large-sized displays such as projection display units.

Further, it is also possible to dispose the aberration correcting coil 7 as the output side of the focus coil 4 and form the bipolar magnet 6 as two sets of bipolar electromagnetic coils integrally therewith.

In a projection display unit of a type having three projection tubes and three projection lenses horizontally arranged, a special auxiliary deflection coil is generally disposed and used to correct a color shift, i.e. misregistration of three color images produced by the three projection tubes. This auxiliary deflection coil is formed as two sets of bipolar auxiliary deflection coils. However, the above described bipolar electromagnetic coil winding can be used as this bipolar auxiliary deflection coil in common.

Further, although the aberration correcting coil is wound around the 8-pole core 10 illustrated in FIG. 3, a 6-pole core can be substituted for this.

FIGS. 9A and 9B are configuration diagrams showing other examples of the aberration correcting coil wound around the 6-pole core. Terminals 8 and 9 respectively correspond to the terminals 8 and 9 shown in FIGS. 2 and 3.

In application to projection display, it is possible to wind two sets of bipolar magnetic field generating coils upon this 6-pole aberration correcting coil as different winding and use the two sets of bipolar magnetic field generating coils thus wound for correcting color shift.

Figure 10:
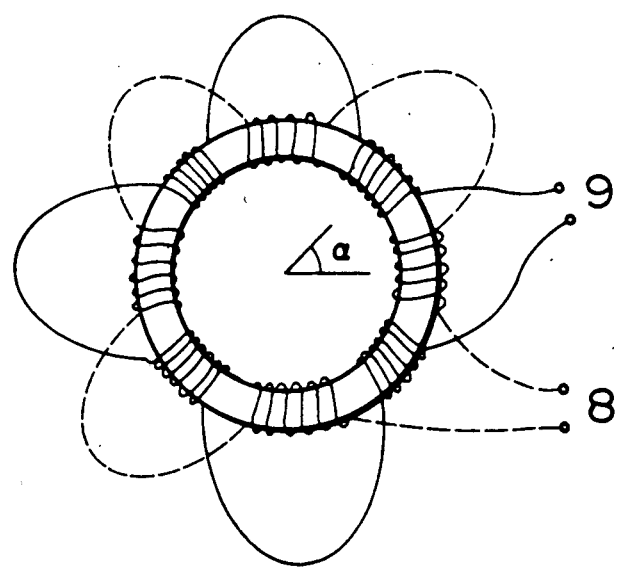

Further, it is possible to use two sets of winding wound around a cylindrical core in a toroidal form or a saddle form as shown in FIG. 10 as the aberration correcting coil. If this winding is so wound that the winding thickness has distribution represented as cos 4α, high harmonic magnetic field other than the 4-pole component is minimized. The core of the deflection coil 3 shown in FIG. 2 can be used as the above described cylindrical core. Because the magnetic field caused by the deflection coil is a bipolar magnetic field and is orthogonal to the 4-pole magnetic field of the present invention and hence mutual interference is prevented.

In reality, dispersion difference of angle caused in the electron gun 2 and the focus coil 4 is approximately ±2 degrees. In application to high definition display having a resolution not less than 1000 lines, this angle dispersion becomes an important factor causing a defocus trouble and lowering the yield. The present invention significantly improves this angle dispersion.

FIGS. 11-16, 17A-17B, and 18-20 show a second embodiment of the present invention. This embodiment aims at correcting astigmatism caused by magnets (16 poles), which are used for correcting pincushion distortion, by using 4-pole aberration coil means (such as coil means shown in FIG. 14).

Terminal $A_1$ is an input terminal of a sawtooth wave signal having a horizontal period, whereas terminal $A_2$ is an input terminal of a sawtooth wave signal having a vertical period. These signals are generated in a deflection circuit of a conventional display apparatus by the well-known technique. Instantaneous amplitudes of these signals nearly correspond to the horizontal and vertical coordinates (x, y) on the display screen. Numeral 50 denotes a correction waveform generation section, which comprises a squaring circuit 30, a retrace line interval flattening circuit 30', a squaring circuit 42, a multiplication circuit 51 and a subtraction circuit 60. For the squaring circuits 30 and 42 as well as the multiplication circuit 51, ICs (MC1495L) produced by Mororola, U.S.A., for example, can be used.

Figure 11:
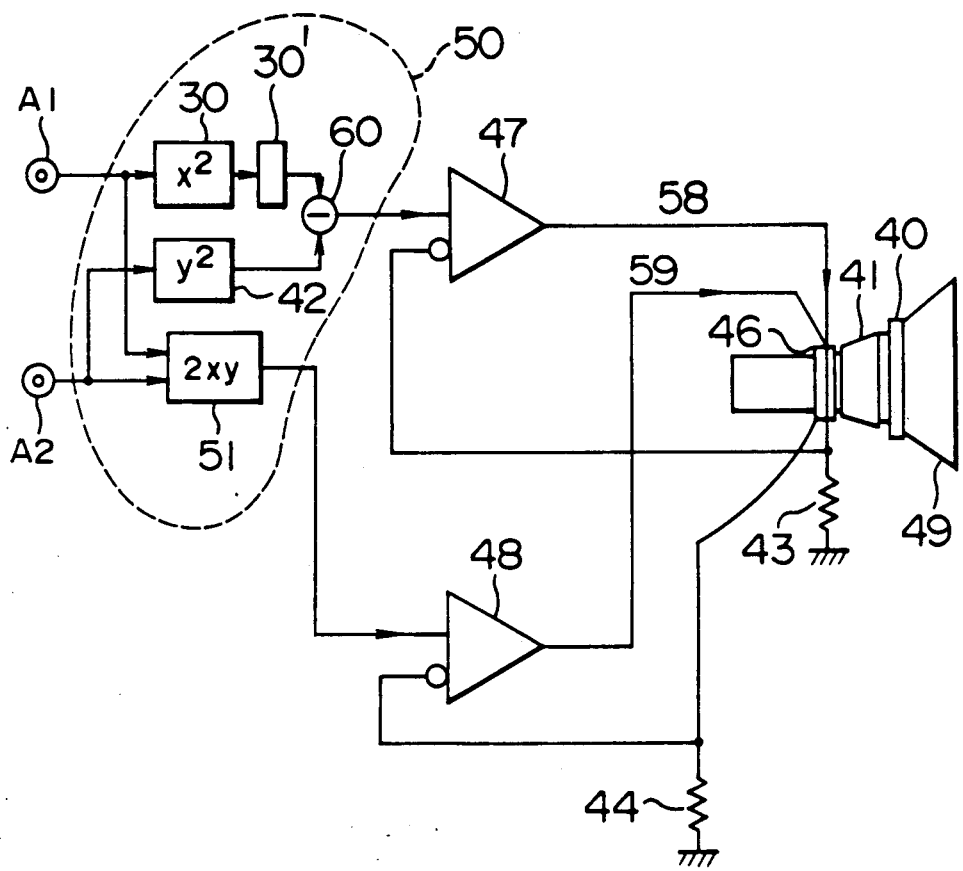
FIG. 11 is a circuit configuration diagram of a second embodiment of the present invention.
Figure 12:
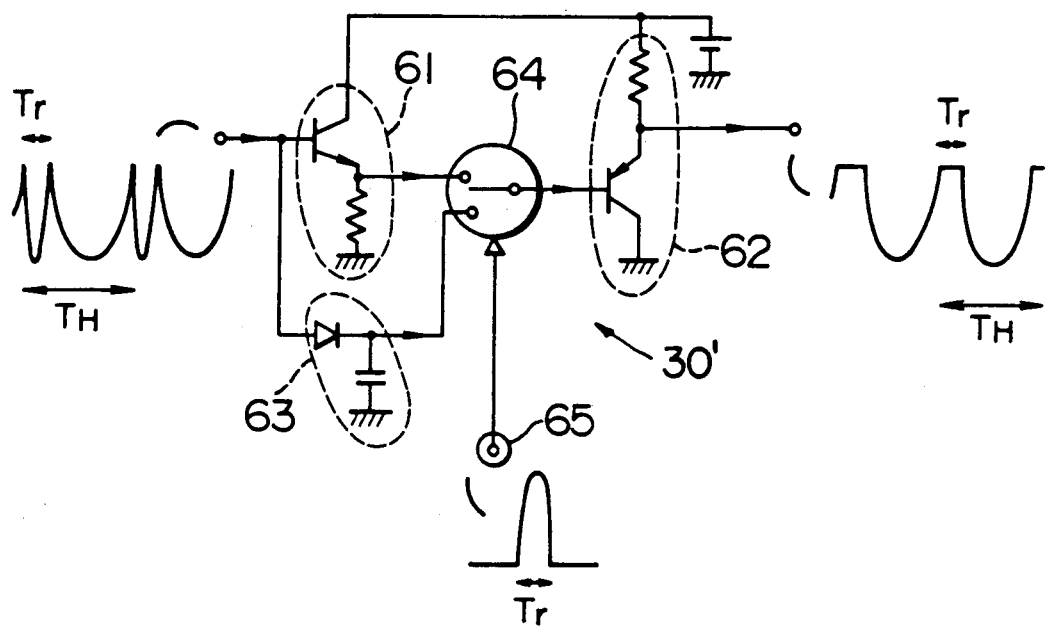
FIG. 12 is a circuit configuration diagram of a retrace line interval flattening circuit shown in FIG. 11.

FIG. 12 is a circuit configuration diagram of the retrace line interval flattening circuit shown in FIG. 11. Numerals 61 and 62 denote emitter followers, 63 a peak amplitude detection circuit, and 64 a changeover switch. On the basis of control of a horizontal retrace line pulse fed from a terminal 65, the switch 64 is changed over to the peak amplitude illustrated at the lower side of FIG. 12 during the retrace line interval. At the output of the flattening circuit, therefore, a parabolic signal having waveform flattened in the retrace line interval is obtained. This retrace line interval flattening circuit is provided to prevent a succeeding amplifier 47 (having an inductance load) from being overloaded during the retrace line interval. An integrating circuit may be used instead of the squaring circuit in order to obtain the parabolic signal. In that case, the parabolic output is decreased to half if the horizontal scanning frequency is raised to twice. By using the configuration of the squaring circuit of the present invention, a parabolic signal free from such a drawback can be obtained.

Referring again to FIG. 11, numerals 47 and 48 denote negative-feedback amplifiers, 49 a CRT, 40 a 16-pole magnet group, 41 a deflection coil, 46 an 8-pole focus coil, 43 and 44 current detecting resistors. The current detecting resistors 43 and 44 are provided for detecting a current flowing through the focus coil 46 and for negatively feeding back the current thus detected to the negative-feedback amplifiers 47 and 48, respectively. This negative-feedback operation makes the current flowing through the focus coil 46 equivalent to respective outputs of the correction waveform generating section 50.

Figure 13:
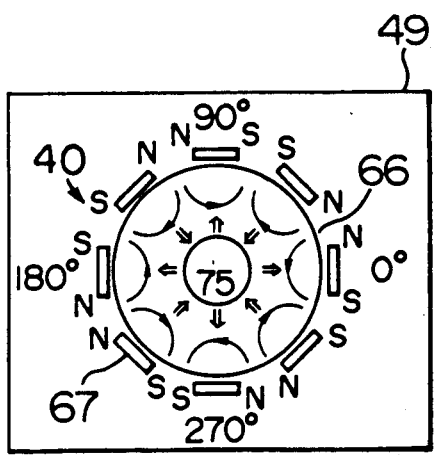
FIG. 13 is a diagram for explaining a 16-pole magnet group shown in FIG. 11.

FIG. 13 is a diagram for explaining the 16-pole magnet 40. FIG. 13 is a view of the CRT block of FIG. 11 seen from the screen side of the CRT.

Referring to FIG. 13, numeral 75 denotes a neck, 66 a periphery of the deflection yoke (DY). Magnets 67 are symmetrically arranged at equal intervals so that the length of individual magnets may be nearly equal to the space between magnets. Directions of magnetic fields are indicated by thin arrows. Directions of auxiliary deflection forces are indicated by thick arrows. As understood from FIG. 13, forces directed outside are generated in directions corresponding to integer multiples of 90°, and forces directed inside are generated in respective directions shifted therefrom by 45°. These forces are set by symmetrical arrangement at directions of exactly 45° instead of so-called diagonal directions (37°). As described later, this aims at matching with pincushion correction from the viewpoint of physics of electron beam track.

Figure 14:
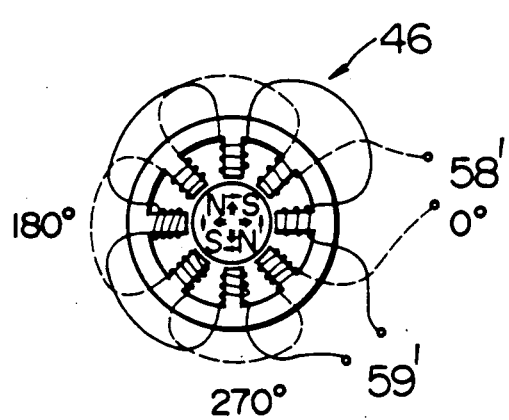
FIG. 14 is a configuration diagram of an 8-pole focus coil shown in FIG. 11.

FIG. 14 is a configuration diagram of the 8-pole focus coil 46 shown in FIG. 11. FIG. 14 is a view obtained when the neck side is seen from the face side. A node of a line 58 of FIG. 11, i.e., a correction waveform corresponding to $x^2-y^2$) is inputted to input terminals 58' of broken lines of FIG. 14. Magnetic field distribution indicated by thin arrows of FIG. 14 is generated. When ($x^2-y^2$) has a positive polarity, local auxiliary deflection forces are generated in directions of thick arrows. As described later, these forces function to correct defocus in directions of integer multiples of 90° on the screen. On the other hand, a node of a line 59 of FIG. 11, i.e., an input signal corresponding to 2xy is inputted to input terminals 59'. Magnetic field distribution and auxiliary deflection force corresponding thereto are represented by a pattern obtained by rotating the arrows of FIG. 14 by exactly 45°.

In order to afford a better understanding of how the above described configuration matches to laws of physics and how the above described configuration makes efficient sue of the laws, relationship between a current I flowing through the deflection coil 41 and deflection length r on the screen will first be described as a first step. The magnetic field distribution and auxiliary deflection effect of the 16-pole magnet group 40 will then be described as a second step. Lastly, the pattern of influence of defocus accompanying the auxiliary deflection effect and the defocus improving effect caused by the 8-pole focus coil will then be described as a third step.

[First step] Relationship between I and r

Figure 15:
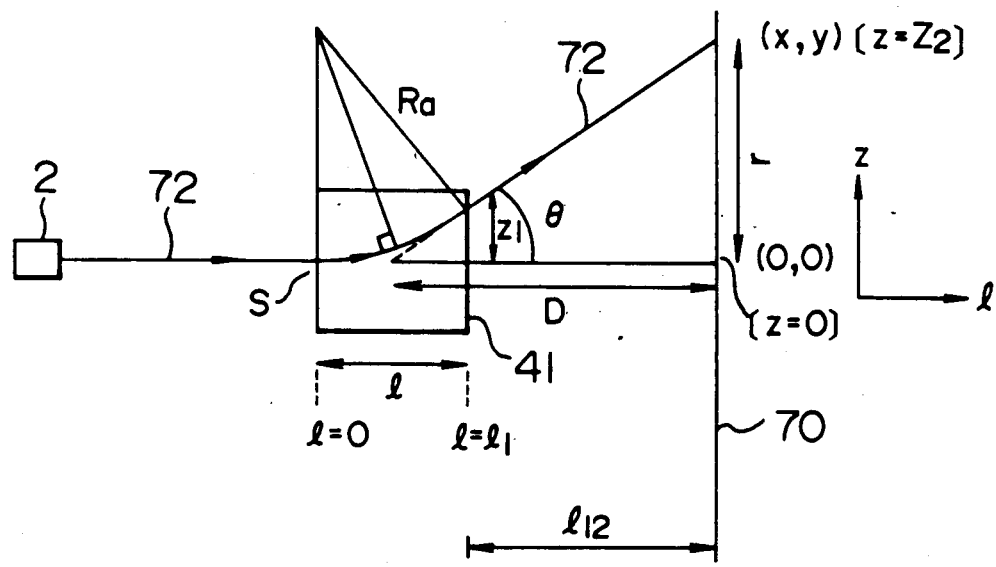
FIG. 15 is a configuration diagram showing deflection of an electron beam caused by a deflection coil.

FIG. 15 is a configuration diagram showing electron beam deflection caused by a deflection coil of uniform magnetic field. Numeral 70 denotes a fluorescent screen, and numeral 72 denotes an electron beam track. Character $\theta$ denotes a deflection angle, r deflection distance, D distance between the deflection center and the fluorescent screen 70, l length of uniform deflection magnetic field, and S cross section of the deflection magnetic field. The direction of the deflection magnetic field is perpendicular to the paper of the drawing and is directed upward perpendicularly to the paper.

As well known, an electron beam is incident on the deflection coil with a velocity v represented by equation (1) below.

$$v = \sqrt{\frac{2qE}{m}} \tag{1}$$

where
$q \approx 16 \times 10^{-20}$ A sec (charge of electron)
$m \approx 0.9 \times 10^{-30}$ kg (mass of electron)
$E = 30$ kV (acceleration voltage)

In a section of constant magnetic field, an electron beam with constant speed makes constant circular motion with angular velocity ω and radius R as a result of Lorentz forces.

$$\omega = \frac{qB}{m} = \frac{qI}{m} \cdot \sqrt{\frac{\mu L}{sl}} \quad (2)$$

where
B = magnetic flux density (Vm²)
I = deflection current
μ = 4π × 10⁻⁷ (H/m)
L = inductance of deflection coil.

$$R = \frac{v}{\omega} \quad (3)$$

On the other hand, equation (4) is obtained from geometrical relationship shown in FIG. 15.

$$\sin\theta = \frac{1}{Ra} \quad (4)$$

Substituting equations (3) and (1) into equation (4), we get $$\sin\theta = \frac{1}{Ra} = \frac{\omega}{v} = \sqrt{\frac{q\mu_0 L 1}{2mES}} \, I \quad (5)$$

Therefore, the sine of the deflection angle is in proportion to the deflection current I.

For brevity of expression without losing generality, current is hereafter normalized with respect to the current value corresponding to $\theta = 90°$. In this case, equation (6) is satisfied.

$$\sin\theta = I \quad (6)$$

On the other hand, the deflection distance r is obtained by multiplying the deflection distance D by $\tan\theta$. Normalizing the deflection distance r with respect to the deflection distance D, we get equation (7).

$$r = \tan\theta \quad (7)$$

Therefore $$r = \frac{1}{\sqrt{1 - I^2}} \approx I + \frac{I^3}{2} \quad (8)$$

$$I = \frac{r}{\sqrt{1 + r}} \approx r - \frac{r^3}{2} \quad (9)$$

Equation (8) means that the distortion pattern is superlinear. Equation (9) means that sublinear correction is required in order to correct the above described distortion.

Representing equation (9) by using vectors, we get $$I = r - r\frac{r^2}{2} = (x, y) - (x, y)\frac{x^2 + y^2}{2} =$$

$$\left( x - \frac{x^3 + xy^2}{2}, y - \frac{x^3 + xy^2}{2} \right)$$

The amount of required correction is represented as $$\Delta r = -\left( \frac{x^3 + xy^2}{2}, \frac{y^3 + yx^2}{2} \right) \quad (10)$$

In the above equation, (x, y) represent normalized positional coordinates on the screen. Representing horizontal and vertical deflection angles by $\theta x$ and $\theta y$, respectively, the coordinates (x, y) are given by equation (11) below.

$$(x, y) = (\sin\theta_x, \sin\theta_y) \quad (11)$$

Referring to equation (10), terms of $x^3$ and $y^3$ are S-correction terms, whereas terms of $xy^2$ and $yx^2$ are pincushion correction terms.

[Second step] Magnetic field distribution and auxiliary deflection effect of 16-pole magnet group 40

FIG. 16 is a sectional view of the 16-pole magnet group 40 shown in FIG. 11. The tube axis of the CRT is perpendicular to the paper of the drawing. This two-dimensional space is represented by a complex number Z, and the tube axis is chosen as the origin. The magnetic pole of each magnet has a linear magnetic charge nearly parallel to the tube axis. Assuming that magnetic charge per unit distance in the tube axis direction (V sec/m) is $M_1$ and the position of the magnetic pole is $Z_i$ (i = 0, 1, 2, ..., 15), therefore, magnetic flux density $B_i$ caused by the at the position $Z_i$ is given by equation (12) below.

Magnets are generally made of ferrite. Since relative permeability of ferrite is nearly equal to unity, the following equation is obtained.

$$B_i(Z) = \frac{M_1}{2\pi(\overline{Z} - \overline{Z_i})} \quad (12)$$

where
$\overline{Z}$ = conjugate complex number of Z
$\overline{Z_i}$ = conjugate complex number of $Z_i$
Equation (12) can be rewritten as $$B_i(Z) = \frac{-M_1}{2\pi \overline{Z}} \cdot \frac{\frac{\overline{Z}}{\overline{Z_i}}}{1 - \frac{\overline{Z}}{\overline{Z_i}}}$$

$$= \frac{-M_1}{2\pi \overline{Z}} \left\{ \frac{\overline{Z}}{\overline{Z_i}} + \left(\frac{\overline{Z}}{\overline{Z_i}}\right)^2 + \left(\frac{\overline{Z}}{\overline{Z_i}}\right)^3 + \dots \right\} \quad (13)$$

Referring to FIG. 16, we get equation (14) on the basis of symmetry of arrangement.

$$\begin{cases} Z_{2n} = Z_0 e^{j\frac{n\pi}{4}} \\ Z_{2n+1} = Z_1 e^{j\frac{n\pi}{4}} \end{cases} \quad (14)$$

where n = 0, 1, 2, ... 7

In case n is even in equation (14), $M_1$ corresponding to an N pole has a positive polarity. In case n is odd, $M_1$ corresponding to an S pole has a negative polarity. By substituting equations (14) and (15) into equation (13), magnetic flux density B which is the sum of $B_i$ of 16 poles can be expressed as $$B(Z) = \Sigma B_i(Z) \qquad (15)$$

$$= \frac{-4M_1}{\pi Z}\left\{\left(\frac{Z}{Z_0}\right)^4 + \left(\frac{Z}{Z_0}\right)^{12} + \left(\frac{Z}{Z_0}\right)^{20} + \ldots + \left(\frac{Z}{Z_1}\right)^4 + \left(\frac{Z}{Z_1}\right)^{12} + \left(\frac{Z}{Z_1}\right)^{20} + \ldots\right\}$$

Referring to equation (15), it is desirable to eliminate the term of the twelfth power. It is attained by letting $$\left(\frac{Z_1}{Z_0}\right)^{12} = -1$$

Referring to FIG. 16, therefore, we get $$\frac{Z_1}{Z_0} = e^{j(\theta_1 - \theta_0)} = e^{j\frac{\pi}{12}} \qquad (16)$$

Hence $$\theta_1 - \theta_0 = \frac{\pi}{12}$$

Therefore $$d = \frac{\theta_1 - \theta_0}{\pi/4} = 0.33$$

Equation (16) means the ratio of non-magnet regions shown in FIG. 16 with respect to all regions, i.e., a space ratio. Relation $d=0.33$ means that the duty factor of the non-magnet sections is 33%.

In this case, it follows that $\theta_0 = \pi/12$, $\theta_1 = 2\pi/12$.

By using the following equation, therefore, equation (15) can be finally rewritten as equation (17).

$$\frac{1}{(Z_0)^4} + \frac{1}{(Z_1)^4} = \frac{e^{\frac{\pi}{3}j} + e^{\frac{2\pi}{3}j}}{R^4} = \frac{\sqrt{3} j}{R^4}$$

where r is radius of magnet arrangement and R is related to $Z_0$ and $Z_1$ as $$\begin{cases} Z_0 = Re^{j\frac{\pi}{12}} \\ Z_1 = Re^{j\frac{2\pi}{12}} \end{cases} \qquad (17)$$

$$B(Z) = \frac{-4\sqrt{3}j(Z)^3}{\pi R^4}\left\{1 + \left(\frac{Z}{R}\right)^{20} + \ldots\right\}$$

As compared with the magnet arrangement radius R, the distance $|Z|$ between the track of electron beam within the CRT and the tube axis is approximately 80% or less.

Therefore, the value of the second term and succeeding terms in {} of equation (17) is approximately 0.01 or less than can be neglected.

Assuming that $|Z|/R=0.8$ in case of the 8-pole magnet group of the prior art, the second term within {} of equation (15) exerts influence which is approximately 0.06 times that of the first term and cannot be neglected.

In case of the form of the present invention comprising the 16-pole magnet group 40, equation (17) can be approximated by equation (18).

$$B(Z) \approx \frac{-4\sqrt{3}j}{\pi R^4}(Z)^3 \qquad (18)$$

The magnetic field distribution has heretofore been derived.

It will now be described that the auxiliary deflection effect generated by this magnetic field distribution matches correction of the pincushion distortion component included in equation (10).

In case of FIG. 2, a CRT electron beam source is located at the upper side perpendicularly to the paper of the drawing in the same way as FIG. 3. Therefore, Lorentz force is applied in such a direction that the above described B(Z) is increased to j times.

Assuming that a proportional constant (a positive number) is K, therefore, the auxiliary deflection amount $\Delta Z$ is represented by equation (19).

$$\Delta Z = K(\bar{Z})^3 \qquad (19)$$

Here, $\Delta Z$ represents coordinates of the electron beam in cross section of magnet arrangement. The coordinates are proportionate to reference coordinates (x, y) on the fluorescent screen as represented in equation (10). Assuming that a new proportional constant (a positive number) is $K_1$, therefore, the auxiliary deflection amount $\Delta Z$ can be represented as $$\Delta Z = K_1(x - jy)^3 \qquad (20)$$
$$= K_1\{(x^3 - 3xy^2) + j(y^3 - 3yx^2)\}$$

Equation (20) is complex number representation. Representing equation (20) in the vector form in the same way as equation (10) and setting magnet strength $M_1$ so that $K=1/6$, however, the difference between equation (20) and equation (10) is represented by equation (21) below.

$$\left(\frac{x^3 - 3xy^2}{6}, \frac{y^3 - 3yx^2}{6}\right) - \Delta r = \frac{2}{3}(x^3, y^3). \qquad (21)$$

As understood from this equation, the pincushion distortion component ($xy^2$, $yx^2$) is eliminated by the 16-pole magnet group. As a result, only S distortion ($x^3$, $y^3$) remains. The S distortion is not the subject of the present invention and it is eliminated by different well-known means.

The second step has heretofore been described.

[Third step] Defocus pattern and its improvement

First of all, defocus action performed by the above described 16-pole magnet group will now be derived.

This defocus action is caused by the fact that the electron beam proceeds to the fluorescent screen with finite expansion in the above described cross section of magnet arrangement. From this standpoint, the above described second step is regarded as description regarding the track of the central portion of expansion of the electron beam. Letting coordinates of the above described central portion be Z and representing the expansion component of the beam as $\delta Z$, equation (19) can be rewritten as equation (22) below.

$$\Delta Z = K(Z + \delta Z)^3 \qquad (22)$$
$$\approx K(Z)^3 + 3K(Z)^2 \delta Z$$

The second term of the right side of the equation (22) represents the defocus component.

Representing the defocus component $D(x, y)$ by means of reference coordinates $(x, y)$ on the fluorescent screen in the same way as rewriting equation (19) as equation (20), we get equation (23).

$$D(x, y) = 3K_1(x - jy)^2 \delta Z \qquad (23)$$
$$= 3K_1(x^2 - y^2, -2jxy) \delta Z$$
$$= 3K_1(x^2 - y^2) \delta Z + 3K_1 2xy \delta(jZ)$$

where
- $(x, y)$ = reference coordinates on the fluorescent screen
- $\delta Z$ = coordinates of expansion of electron beam measured from center of the electron beam
- $K_1$ = proportional constant Resolving Z in equation (23) into $(\delta x' + j\delta y')$, the meaning of the first term and the second $(67\ x' + j\delta y')$ space are shown in FIGS. 17A and 17B.

FIGS. 17A and 17B are diagrams for explaining the defocus interference of magnets. The first term of equation (23) represents astigmatic defocus in a region $x^2 - y^2 > 0$ on the fluorescent screen, i.e., at the left and right ends of the drawing as shown in FIG. 17A. That is to say, the lateral expansion of the electron beam has insufficient focus, whereas the vertical expansion of the electron beam has overfocus. On the other hand, equation (23) means astigmatism in regions on the screen represented as $xy > 0$, i.e., in the regions of the first and third quadrants as shown in FIG. 17B.

Description of defocus action caused by the 16-pole magnet group is terminated here. It will now be described that the correction action performed by the 8-pole focus coil matches the above described defocus correction.

First of all, 4-pole components as represented by the broken lines of FIG. 14 will now be described.

As described before, the $(x^2-y^2)$ signal of FIG. 11 is applied to the 4-pole coil. By using a technique similar to that used to derive equation (18) from the above described equation (12), the magnetic field distribution of this 4-pole coil is derived. Representing the magnetic flux density generated by each of the four poles as $Ci(Z)$, we get $$Ci(Z) = \frac{N_1}{2\pi(Z - Zi)} \qquad (24)$$
$$= \frac{-N_1}{2\pi Z}\left\{\frac{Z}{Zi} + \left(\frac{Z}{Zi}\right)^2 + \left(\frac{Z}{Zi}\right)^3 + \ldots\right\}$$

where $N_1$ = magnetic charge (Vsec/m) of each magnetic pole per unit distance in the tube axis direction, which is proportionate to $(x^2-y^2)$ $i = 0, 1, 2, 4, \ldots$ Noting that magnetic poles are symmetrically arranged at intervals of $0°$, the total sum of magnetic flux densities of 4 poles is derived. Letting this total sum be $C(Z)$, we get $$C(Z) = \frac{2N_1 j}{\pi Z}\left\{\frac{(Z)^2}{R_0^2} - \frac{(Z)^6}{R_0^6} + \ldots\right\} \qquad (25)$$
$$\approx \frac{2N_1 j}{\pi R_0^2} Z$$

where
- $R_0$ = radius distance between 4-pole magnetic field and tube axis, $R_0 = |Z_i|$
- $N_1 \propto (x^2-y^2)$ Representing the auxiliary focus action of electron beam performed by the above described magnetic field $C(Z)$ as $E(Z)$, $E(Z)$ is equivalent to; times equation (25) on the basis of Lorentz's law.

$$E(Z) \approx -\frac{2N_1}{\pi R_0^2} Z \propto \frac{-2(x^2 - y^2)}{\pi R_0^2} Z \qquad (26)$$

Comparing equating (26) with the first term of the right side of equation (23), $\delta Z$ in equation (23) indicates coordinates representing expansion of the electron beam at the position of the 16-pole magnet group 40 shown in FIG. 11, whereas Z in equation (26) indicates coordinates corresponding to expansion of the electron beam at the position of the focus coil 46 shown in FIG. 11.

FIG. 18 is a diagram for explaining expansion of the electron beam. As indicated by arrows of FIG. 18, the electron beam is focused onto the fluorescent screen. In such a range that the above described defocus correction amount is minute, therefore, the above described $\delta Z$ and Z are proportionate to each other. By suitably setting the signal amplitude of the node 58 in FIG. 11, therefore, equation (26) can exactly correct the first term of equation (23).

In the same way, the second term of the right side of equation (23) can be corrected by the 4-pole focus coil 59' represented by the solid line of FIG. 14. Therefore, defocus caused by the 16-pole magnet group 40 can be corrected by two sets of 4-pole focus coils, i.e., the 8-pole focus coil.

The principle of correction in the second embodiment of the present invention has heretofore been described.

Examples of numerical values will now be described.

In a projection display apparatus, each of magnitudes of the deflection angles $\theta_x$ and $\theta_y$ in equation (11) is approximately 20 degrees. Corresponding thereto, maximum values of reference fluorescent screen coordinates $(x, y)$ of equations (11) and (10) are approximately (0.34, 0.34) at lateral ends and vertical ends of the screen. In this case, ratios of changes of pincushion distortion components $xy^2/2$ and $yx^2/2$ in equation (10) with respect to the above described maximum values can be represented as $$\left(\frac{xy^2}{2x_{MAX}}\right)_{MAX} \approx 0.06$$

$$\left(\frac{yx^2}{2y_{MAX}}\right)_{MAX} \approx 0.06$$

That is to say, the amount of pincushion distortion is approximately 6%.

Figure 19:
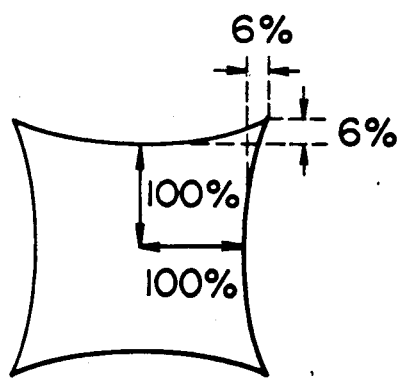
FIG. 19 is a diagram for explaining definition of pincushion distortion.

FIG. 19 is a diagram for explaining definition of pincushion distortion. The amount of defocus obtained when the above described pincushion distortion of 6% is corrected and absorbed by the magnet group 40 shown in FIG. 11 depends upon the expansion radius $|\delta Z|$ and the amount of deflection $|Z|$ at cross section passing through the inside of the magnet group 40. The magnitude of defocus amount is obtained by multiplying the ratio of the second term of the right side of the above described equation (22) with respect to its first term by the above described pincushion correction amount of 6% as $$\left|\frac{3\delta Z}{Z}\right| \times 6\%$$

The magnitude of $|\delta \overline{Z}/\overline{Z}|$ in the above expression is approximately 2 mm/30 mm at cross section of the magnet group 40. Therefore, the magnitude of defocus amount in the above expression becomes approximately 0.4%, where 100% means half screen width as illustrated in FIG. 19.

In a display for which high-degree focus performance is demanded, it is necessary to suppress the defocus within approximately 0.1% of half screen width. Therefore, the correction circuit illustrated in FIG. 11 is necessary. Thereby, high-degree focus performance can be realized.

The second embodiment of the present invention has heretofore been described.

The essential point of the present embodiment is to correct the defocus action of magnets for pincushion distortion correction by using two pairs of 4-pole focus coils. This correction effect is effective for not only the symmetric 16-pole magnet arrangement illustrated in FIG. 16 but also for a conventional 8-pole magnet arrangement. In application to such a case, slight pincushion distortion correction residue remains. However, this residue can be overcome by a well-known method of making a correction current flow through the deflection coil. In such an application example as well, the defocus improving scheme of the present invention effectively functions.

Further, in FIG. 11, the ($x^2-y^2$) signal and the correction signal of $2xy$ are generated by analog multipliers. However, these signals may be generated by using digital multipliers or digital memory means.

As pincushion distortion correcting means, there is also known means of the prior art for correcting pincushion distortion on the screen by making the winding distribution of the deflection coil 41 of FIG. 11 contain the third-order higher harmonic component as described in the aforementioned literature so that a nonuniform magnetic field component proportionate to the square of $\overline{Z}$ may be generated in the magnetic field distribution of this deflection coil. However, this means is not recommended because this means causes stronger defocus interference as compared with means of the magnet group 40 of FIG. 11.

In accordance with the present invention, a coil of nearly uniform magnetic field is used as the deflection coil 41, and magnetic field proportionate to cube of $\overline{Z}$ as indicated in equation (18) is formed as the magnetic field distribution of the magnet group 40 located at the output side of the deflection coil. This results in a feature of less focus deterioration as compared with the correction scheme by using the magnetic field distribution of the deflection coil.

The magnet group 40 in the above described second embodiment may be replaced with an electromagnet group.

Figure 20:
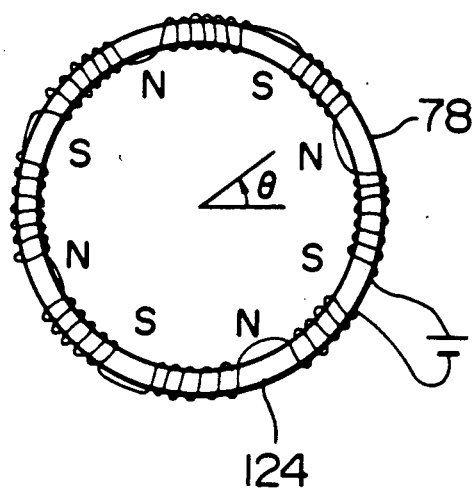
FIG. 20 is a diagram for explaining a configuration example wherein magnets shown in FIG. 11 are replaced by electromagnets.

FIG. 20 is a configuration diagram of another embodiment in which electromagnets are used instead of the magnet group 40 of FIG. 11. In the configuration of FIG. 20, a DC current is made to flow through 8 coils wound around an iron core 78 to generate a symmetric 8-pole magnetic field. Toroidal winding or saddle winding is adopted for this coil. Although detailed analysis is omitted, it is possible to make only the first term within {} functions in the above described equation (17) by making the winding thickness distribution proportionate to $\cos 4\theta$.

Further, in FIG. 14, two sets of 4-pole focus coil comprise individual coils wound around respective pole pieces. Instead, toroidal winding wound around a cylindrical core may also be used.

As this cylindrical core, the cylindrical core for the deflection coil 41 shown in FIG. 11 may also be used in common. In this case, two sets of winding are wound around the cylindrical core as separate winding. Because the bipolar magnetic field generated by the deflection coil is related to the 4-pole magnetic field generated by separate winding in mutual perpendicular functions and hence the mutual interference is minimized.

In the analysis of principle heretofore described, fringe effects of the magnet 40, the deflection coil 41 and the 8-pole focus coil 46 in the tube axis direction have been neglected. This is sufficiently justified in principal application of the present invention in which the deflection angle and the auxiliary deflection angle are small as described before.

Description of the second embodiment of the present invention is terminated here. A third embodiment will now be described.

In the third embodiment, defocus generated by a secondary effect of the magnetic field of the above described pincushion distortion correcting magnet is eliminated by giving beforehand distortion of opposite polarity to magnetic field generated by the deflection coil (41 of FIG. 11).

Figure 21:
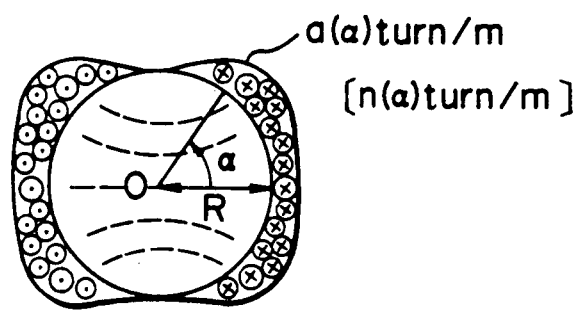
FIGS. 21 and 22 are diagrams for explaining distribution of the number of turns of horizontal and vertical deflection coils according to a third embodiment of the present invention.
Figure 22:
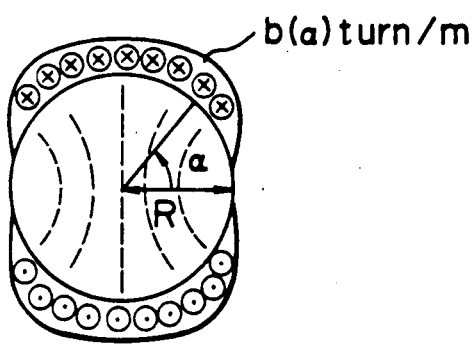

For this purpose, the horizontal deflection coil and the vertical deflection coil have turn number distribution as illustrated in FIG. 21 and that illustrated in FIG. 22, respectively. Further, these deflection coils respectively have such polarities as to intentionally strengthen pincushion distortion on the screen. Broken lines illustrated in FIGS. 21 and 22 represent equi-magnetic potential faces within the CRT neck. The electron beam is deflected along directions of those faces.

The present invention will now be described quantitatively.

Assuming that the deflection coils respectively have $a(\alpha)$ and $b(\alpha)$ as turn number distribution as shown in FIGS. 21 and 22, each of them is so defined as to contain a fundamental frequency component and a third-harmonic component with respect to $\alpha$. That is to say, $$\begin{cases} a(\alpha) \approx a_1 \cos\alpha + a_3 \cos3\alpha \\ b(\alpha) \approx b_1 \cos\left(\alpha - \frac{\pi}{2}\right) + b_3 \cos3\left(\alpha - \frac{\pi}{2}\right) \end{cases} \quad (27)$$

If $a_1$, $a_3$, $b_1$ and $b_3$ of equation (27) are so selected as to satisfy the relation $$\frac{a_3}{a_1} \approx \frac{b_3}{b_1} < 0,$$

defocus is canceled by the deflection coil magnetic field although pincushion distortion is slightly worsened. That reason will now be further described quantitatively.

When currents $I_x$ and $I_y$ are made to flow through the horizontal and vertical deflection coils, respectively, the magnetic field $H(Z)$ within the CRT neck of the deflection coil section is given by the following equation as a solution of a two-dimensional Laplace equation although the detailed process is omitted.

$$H(Z) = ja_1 I_x \left\{ 1 + \frac{a_3}{a_1}\left(\frac{Z}{R}\right)^2 \right\} - b_1 I_y \left\{ 1 + \frac{b_3}{b_1}\left(\frac{Z}{R}\right)^2 \right\} \quad (28)$$

As already described with reference to FIGS. 6A and 6B, the electron beam depicts a nearly circular track in the deflection coil section. At the inlet of the deflection coil, therefore, Z may be defined as Z=0 in equation (28). Assuming that coordinates at the outlet are represented by $Z_1$, however, $Z_1$ can be approximated as $$Z_1 \approx (x + jy)\frac{l}{2D} \quad (29)$$

Reference characters in equation (29) have meaning as shown in FIGS. 6A, 6B and 15. Average magnetic field through which the electron beam passes becomes weighted average of equation (28) along the track. Its weighting coefficient can be approximated as $$\frac{d\sqrt{Z}}{\sqrt{Z_1}} \quad (29)$$

Because $$\sqrt{Z}$$

is proportionate to time. Representing average magnetic field by $H_{av}$, therefore, we get $$H_{av} = \int_0^{\sqrt{Z_1}} H(Z) \frac{d\sqrt{Z}}{\sqrt{Z_1}}$$

Considering also the expansion of the electron beam, Z in equation (28) should be replaced as $Z \rightarrow Z + \delta Z$. With regard to this, we get $$H_{av} = \int_0^{\sqrt{Z_1}} H(Z + \delta Z) \frac{d\sqrt{Z}}{\sqrt{Z_1}}$$

$$= ja_1 I_x - b_1 I_y + \Delta H_{av}$$

$$\Delta H_{av} = j(a_3 I_x - jb_3 I_y) \left( \frac{Z_1^2}{5R^2} + \frac{2Z_1 \delta Z_1}{3R^2} + \frac{(\delta Z_1)^2}{R^2} \right) \quad (30)$$

In this equation, terms of $a_1 I_x$ and $b_1 I_y$ represent average magnet field caused by uniform magnetic field components. The term of $\Delta H_{av}$ represents the average value of the third harmonic magnetic field.

Considering the condition $$\frac{a_3}{a_1} = \frac{b_3}{b_1}, \text{ we get}$$

$$a_3 I_x - jb_3 I_y = \frac{a_3}{a_1}(a_1 I_x - jb_1 I_y)$$

where $a_1 I_x - jb_1 I_y$ is proportionate to $(x_1 - jy_1) = \overline{Z}_1$. Assuming that $k_3$ is a positive proportional constant, therefore, the amount of additional deflection $\Delta Z_{DY}$ caused by equation (30) is represented as $$\Delta Z_{DY} = \frac{K_3 a_3}{a_1} \left( \frac{(\overline{Z}_1)^3}{5R^2} + \frac{2(\overline{Z}_1)^2 \delta Z_1}{3R^2} + \frac{\overline{Z}_1(\delta Z_1)^2}{R^2} \right) \quad (31)$$

$$\approx \frac{K_3 a_3}{a_1} \cdot \frac{(\overline{Z}_1)^3}{5R^2} + \frac{K_3 a^3}{a_1} \cdot \frac{2(\overline{Z}_1)^2 \delta Z_1}{3R^2}$$

Because $$\left|\frac{\delta Z_1}{Z}\right| << 1$$

Since $$\frac{a_3}{a_1} < 0,$$

the first term of the right side of equation (31) means that pincushion distortion is given and the second term means negative astigmatism.

Equation (22) representing the amount of additional deflection caused by magnets as already described is rewritten as $\Delta Z_M$.

$$\Delta Z_M = K(Z_M + \delta Z_M)^3 \quad (32)$$

$$\approx K(Z_M)^3 + 3K(Z_M)^2 \delta Z_M$$

The object is to eliminate the pincushion distortion component contained in the above described equation (20) to the utmost by a component depending upon $\overline{Z}^3$ included in the total amount of additional deflection ($\Delta Z_M + \Delta Z_{DY}$) and make the component depending upon $(\overline{Z})^2$ and that depending upon $\delta \overline{Z}$ cancel each other.

From equations (31) and (32), we get $$\Delta Z_M + \Delta Z_{DY} = K(Z_M)^3 + \frac{K_3 a_3}{a_1} \cdot \frac{(Z_1)^3}{5R^2} + \tag{33}$$

$$3K(Z_M)^2 \delta Z_M + \frac{K_3 a_3}{a_1} \cdot \frac{2(Z_1)^2 \delta Z_1}{3R^2}$$

In this equation, $\delta Z_M$ and $\delta Z_1$ represent amounts of expansion of the electron beam in the magnet section and the DY output section, respectively. Therefore, $\delta Z_M$ may be regarded as nearly equivalent to $\delta Z_1$. Accordingly, $\delta Z_M$ is represented by $\delta Z_1$.

On the other hand, $Z_M$ and $Z_1$ are deflection amounts of central portion of the electron beam in the magnet section and in the DY output section, respectively. Typically, $Z_M$ is approximately twice $Z_1$. That is to say $$Z_M \approx 2Z_1$$

Substituting these relations into equation (33), we get $$\Delta Z_M + \Delta Z_{DY} \approx \left(8K + \frac{K_3 a_3}{5 a_1 R^2}\right)(Z_1)^3 + \tag{34}$$

$$\left(12K + \frac{2K_3 a_3}{3 a_1 R^2}\right)(Z_1)^2 \delta Z_1$$

In this equation, the defocus factor, i.e., the component depending upon $\delta Z_1$ can be eliminated if the following relation is satisfied.

$$\frac{a_3}{a_1} = -\frac{18KR^2}{K_3} \tag{35}$$

Substituting this condition into equation (34), we get $$\Delta Z_M + \Delta Z_{DY} \approx \frac{4.4}{8} \{8K(Z_1)^3\} \tag{36}$$

Meaning of these equations will now be described.

If the winding distribution of DY (deflection coil) is adapted to include a negative third-harmonic component so that equation (35) may be satisfied, the defocus component proportionate to $\delta Z_1$, i.e., the astigmatism component can be eliminated. If the same magnet is used instead, its pincushion correcting effect lowers to 4.4/8 times, i.e., approximately half. If, on the contrary, the magnet strength is increased to approximately twice, and the ratio $a_3/a_1$ in equation (27) and hence the ratio $b_3/b_1$ is so selected that the negative third-harmonic component may also be strengthened to approximately twice, therefore, defocus can be synthetically eliminated and pincushion distortion can be eliminated.

If the amount of residue pincushion distortion can be made to be approximately 0.7 times or less as compared with the amount represented by equation (20) for the case of the uniform magnetic field, electric power required for pincushion distortion correction in practical use can be reduced to half because $(0.7)^2 = 0.5$. Therefore, effects of the present invention can be sufficiently demonstrated.

In the prior art, the problem of deflection defocus could not be overcome because only attempt to reduce pincushion distortion by contriving the winding distribution of DY was made.

In the present invention, however, the conception has been changed. That is to say, pincushion distortion is increased, on the contrary, in the DY and thereafter the pincushion distortion is decreased by magnets. As a result, the problem of deflection defocus can be radically overcome.

In the description of the second embodiment heretofore made, approximation of neglecting defocus caused by the term of $(\delta Z)^2$ and terms of higher orders in equations (22) and (32) has been made because it is smaller than the defocus caused by the term of $(\delta Z)^1$. Defocus caused by $(\delta Z)^2$ is so-called comatic aberration. Since this can be easily eliminated by contrivance of winding distribution well known in the field of DY for conventional in-line color television of direct-view type (non-projection type), the defocus caused by $(\delta Z)^2$ will not be described herein in detail. Further, the term of $(\delta Z)^3$ represents so-called spherical aberration and it can be easily eliminated by disposing an 8-pole weak magnet group at the inlet side of DY.

Figure 23:
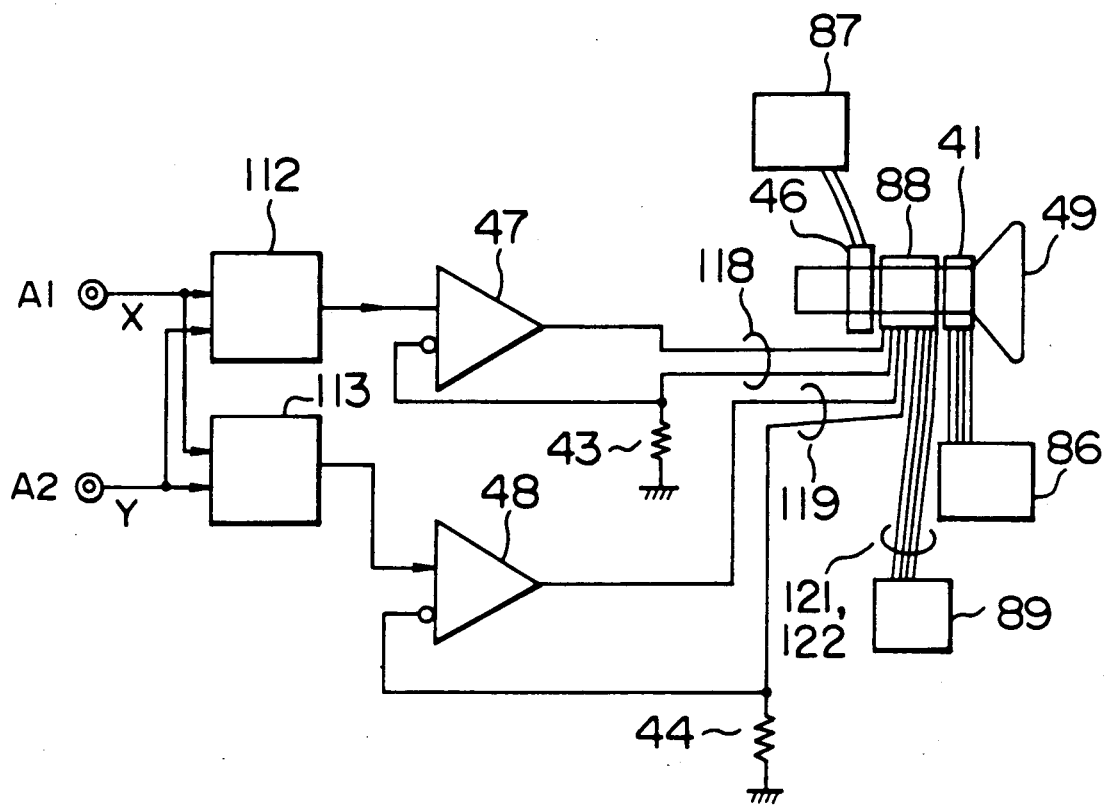
FIG. 23 is a schematic circuit configuration diagram showing another embodiment of the present invention.

FIG. 23 shows a circuit nearly equivalent to the circuit of FIG. 11. The circuit of FIG. 23 is different from that of FIG. 11 in that the aberration correcting coil and an auxiliary deflection coil are wound in the same core. The same components as those of FIG. 11 are denoted by like numerals.

Numeral 86 denotes a deflection circuit for exciting the deflection coil 41, 87 a focus circuit, 88 a coil including an aberration correcting coil including windings 118, 119 and 123 and an auxiliary deflection coil including windings 121 and 122 wound on the same core and 89 an auxiliary deflection signal generating circuit for exciting the auxiliary deflection coil portion of coil 88. For clarity, winding 123 of coil 88 is not shown in FIG. 23, but is shown in FIG. 24C.

Referring to FIG. 23, the horizontal deflection sawtooth wave signal is inputted to $A_1$, and the vertical deflection sawtooth wave signal is inputted to $A_2$. These signals are well known sawtooth wave signals having horizontal and vertical periods, respectively. These signals are hereafter denoted by X and Y (time functions), respectively.

Numerals 112 and 113 denote quadratic function signal generating circuits for generating quadratic function signals having a form of $k_1 X^2 + k_2 XY + k_3 Y^2 + k_4 X + k_5 Y + k_6$, where $k_1$ to $k_6$ are constants.

By this configuration, it is possible to let flow currents respectively depending upon quadratic functions of X and Y through the aberration correcting coil. Therefore, 4-pole magnetic fields formed by respective currents are controlled in accordance with respective quadratic functions.

The reason why the aberration correction is achieved by the above described configuration will now be described in detail.

On the basis of detailed analysis hereafter described, the present invention has been obtained.

FIG. 21 shows the pattern of distribution $n(\alpha)$ of the number of turns of the horizontal deflection winding of the main deflection coil 41 per unit length. Origins of an orthogonal coordinate system and a polar coordinate system are set at the center of the cross section of the CRT neck.

First of all, unevenness of magnetic field distribution within the CRT neck causing aberration is quantitatively derived as the function of $n(\alpha)$.

Since $n(\alpha)$ is a periodic function having a period of $2\pi$, it can be expanded into Fourier series as $$n(\alpha) = \text{Real } \Sigma a_n e^{jn\alpha} \quad (1)'$$

where
Real = real part
$a_n$ = complex amplitude of 2n pole component
$\Sigma$ = the total of n = 1, 2, 3, ...

Outside space of the deflection coil is filled with a core material having a sufficiently large relative permeability. Representing the magnetic potential along the internal face of the deflection coil, i.e., along the outer circumference of the neck by $\Phi(Re^{j\alpha})$, therefore, we get $$-\phi(Re^{j\alpha}) = \int I_x n(\alpha) d(R\alpha) = \text{Real } \Sigma \frac{I_x a_n \left(\frac{Z}{R}\right)^n R}{jn} \quad (2)'$$

where
$I_x$ = current of horizontal deflection coil
$Z = x + jy$ $$\frac{Z}{R} = e^{j\alpha} \quad (\because |Z| = R)$$

Since a magnetism source is not present in space inside the neck, magnetic potential (Z) in space inside the neck is also given by the same form as that of equation $(2)'$. Therefore $$-\Phi(z) = \text{Real } f(z)$$

where $$f(z) = \Sigma \frac{I_x a_n \left(\frac{Z}{R}\right)^n R}{jn} \quad (3)'$$

Representing the magnetic field in space inside the neck by $H(Z)$, we get $$H(z) = -\text{Grad } \phi(z) = -\left(\frac{\partial \phi}{\partial x} + j\frac{\partial \phi}{\partial y}\right)$$

Letting the real part of the complex function $f(z)$ be X and the imaginary part thereof be Y ($X = -\Phi$), we get $$f(z) = X + jY$$

Since $f(z)$ is regular, it follows from Cauchy's condition that $$\frac{\partial X}{\partial y} = -\frac{\partial Y}{\partial x}$$

Therefore, we get $$H(z) = \frac{\partial X}{\partial x} + j\frac{\partial X}{\partial y} = \frac{\partial X}{\partial x} - j\frac{\partial Y}{\partial x} \quad (4)'$$

$$= \frac{\partial f(z)}{\partial x} = f'(z)$$

where

"—" = conjugate complex number
Substituting equation $(3)'$ into equation $(4)'$, we get $$H(z) = \Sigma j a_n \left(\frac{\overline{Z}}{R}\right)^{n-1} I_x \quad (5)'$$

$$= jI_x \left\{ a_1 + a_2 \frac{\overline{Z}}{R} + a_a \left(\frac{\overline{Z}}{R}\right)^2 + \cdots \right\}$$

Equation $(5)'$ represents a magnetic field generated by the horizontal deflection coil. As understood from this equation, the magnetic field of the 2n pole component is proportionate to $(\overline{Z})^{n-1}$.

Since $a_1$ in equation $(1)'$ is generally a real number, $ja_1$ in equation $(5)'$ means a magnetic field in the imaginary direction (y direction), and hence deflection of the electron beam into the horizontal direction (x direction). When the relation $$0 = a_2 = a_a = \ldots \quad (6)'$$

is satisfied, we get $H(z) = jI_x a_1$. That is to say, a uniform magnetic field is obtained.

For avoiding focus deterioration, a uniform magnetic field is desirable. In reality, however, it is difficult to satisfy equation $(6)'$. As for $$\frac{a_2}{a_1}, \frac{a_3}{a_1} \text{ etc.},$$

dispersion such as $$\left|\frac{a_2}{a_1}\right| = 0.01,$$

$$\left|\frac{a_2}{a_1}\right| \approx 0.5 \text{ remains.}$$

Influence of images such as $a_2$ and $a_3$ upon geometric distortion and its influence upon defocus will now be described successively.

INFLUENCE UPON GEOMETRIC DISTORTION

In FIG. 15, numeral 72 denotes a track of core of an electron beam. Referring to FIG. 15, the original point corresponds to the start point section of the deflection coil 41. In the tube axis direction, a real number coordinate l is set. A complex number coordinate Z is set in a plane perpendicular to the tube axis. It is assumed in approximation that the magnetic field of the deflection coil 41 exists only in the section represented as $l = [0, l_1]$. In accordance with well-known deflection physics, the electron beam makes circular motion with constant angular velocity in the section wherein the magnetic field exists. On the assumption of equation $(6)'$, sine of the resultant deflection angle $\theta_x$ is proportionate to $a_1 I_x$ as $$\sin\theta_x = ka_1 I_x \quad (7)'$$

Where k is a proportional constant. Further, the amount of deflection $Z_2$ on the face plate is proportional to $\tan\theta$. The amount of deflection $Z_1$ at the terminal point of the deflection section is also nearly proportionate to $\tan\theta_x$.

$$|Z_2| \approx \left(\frac{l_1}{2} + l_{12}\right)\tan\theta_x \quad (8)'$$

$$\approx \left(\frac{l_1}{2} + l_{12}\right)ka_1I_x\left(1 + \frac{(ka_1I_x)^2}{2}\right)$$

$$|Z_1| \approx \frac{l_1}{2}\tan\theta_x \quad (9)'$$

Contribution of $a_2$ and $a_3$ in case equation $(6)'$ is not satisfied will now be described.

After all, it is a question of how much the deflection angle $\theta_x$ undergoes perturbation displacement along the track of the electron beam in the section $l=[0, l_1]$ by the contribution of $a_2$ and $a_3$. In a CRT for projection display, the value of $\theta_x$ is typically 0.5 read or less. Therefore, the circular motion of the electron beam can be approximated by a parabolic motion with a constant speed in the l-axis direction.

That is to say, the question revolves itself down to deriving $H_{av}$ obtained by averaging $H(Z)$ in equation $(5)'$ along the track of FIG. 15.

$$H_{av} = \int H(z) \, dW(z) \quad (10)'$$

where $dW(z)$ is stay time ratio of weighting differentials $i$ and $l_1$, and $$dW(z) = \frac{dl_1}{l_1} = \frac{d\sqrt{z}}{\sqrt{z_1}} \quad 11'$$

because $Z \propto l_2$ (parabolic motion)
Further $$\frac{d\sqrt{z}}{\sqrt{z_1}} = \frac{d\sqrt{x}}{\sqrt{x_1}} = \frac{d\sqrt{y}}{\sqrt{y_1}}$$

$$Z_1 = x_1 + jy_1$$

From equations $(10)'$ and $(11)'$, we get $$H_{av} = jI_xa_1\left(1 + \frac{a_2}{3a_1}\frac{Z_1}{R} + \frac{a_a}{5a_1}\left(\frac{Z_1}{R}\right)^2 + \ldots\right) \quad 12'$$

Referring to this equation, the term of $$\frac{Z_1}{R}$$

generates linearity distortion of second order, whereas the term of $$\left(\frac{Z_1}{R}\right)^2$$

generates linearity. Quantitatively speaking, the magnitude of $$\left|\frac{Z_1}{R}\right|$$

is approximately 0.5 at the left and right ends of the screen. When actual dispersion values of $$\left|\frac{a_2}{a_1}\right| \text{ and } \left|\frac{a_3}{a_1}\right|$$

were approximately 0.01 and 0.05 respectively as described before, dispersion of geometric distortion comprising distortion of second order of approximately 0.17% and distortion of third order of approximately 0.25% was generated. These values are generally tolerated in view of user object of the display.

Foregoing description has been made with respect to the horizontal deflection magnet field. However, foregoing description holds true for the vertical deflection magnetic field as well.

Description of geometric distortion is terminated here. Influence upon defocus will now be described.

INFLUENCE UPON DEFOCUS

It is now assumed as shown in FIG. 18 that the diameter of expansion of the electron beam in the deflection section is $2r_0$. It is further assumed that relative coordinates $Z_0$ of each portion of the beam with respect to the beam core are represented as $$Z_0 = r_0 e^{ja_0} = x_0 + jy_0$$

Average acting magnetic field for the beam core is represented by the already described equation $(1)(2)'$. On the basis of nonuniformity of the deflection magnetic field, each portion of the beam passes through an average acting magnetic field difference from that of equation $(1)(2)'$. Letting this average acting magnetic field be $H_{av}(Z_0)$ and letting the difference between $H_{av}(Z_0)$ and $H_{av}$ be $\Delta H_{av}(Z_0)$, we get $$H_{av}(Z_0) = \int H(z+z_0) \, d\overline{W}(z)$$

$$\Delta H_{av}(Z_0) = \int \{H(z+z_0) - H(z)\} d\overline{W}(z)$$

Substituting equations $(5)'$ and $(11)'$ into this equation, we get $$\Delta H_{av}(Z_0) = \int \Sigma ja_nI_x \frac{(z+z_0)^{n-1} - (z)^{n-1}}{R^{n-1}} dW(z) \quad 13'$$

$$= ja_1I_x\left\{\frac{a_2}{a_1}\cdot\frac{z_0}{R} + \frac{a_3}{a_1}\frac{\frac{2z_1z_0}{3} + z_0^2}{R^2} + \ldots\right\}$$

In order to obtain the criterion of the magnitude of this equation, it is normalized by an average acting magnetic field $H_M$ corresponding to the right end of the screen in the horizontal direction and a horizontal deflection current $I_M$ at that time.

$$H_M = ja_1I_M \quad 14'$$

-continued $$\frac{\Delta H_{av}(Z_0)}{H_M} = \frac{I_x}{I_M}\left(\frac{a_2}{a_1}\cdot\frac{z_0}{R} + \frac{a_3}{a_1}\frac{\frac{2z_1 z_0}{3} + z_0^2}{R^2} + \dots\right)$$

The magnitude of this equation can be regarded as the relative value of the amount of defocus on the CRT face with respect to half screen width.

At the right end of the screen, $I_x = I_M$. Further, $$\left|\frac{z_1}{R}\right| \approx \frac{1}{2}, \left|\frac{z_0}{R}\right| \approx \frac{1}{5}$$

$$\left|\frac{a_2}{a_1}\right| \approx \frac{1}{100}, \left|\frac{a_3}{a_1}\right| \approx \frac{1}{20}$$

Among them, $Z_0/R$ is large especially in an electromagnetic focus scheme according to the present invention. Substituting these values into equation ①④', we get $$\text{term of }\frac{z_0}{R}: \frac{1}{100}\times\frac{1}{5} = \frac{1}{500}$$

$$\text{term of }\frac{z_1 z_0}{R^2}: \frac{1}{20}\times\frac{2}{3}\times\frac{1}{2}\times\frac{1}{5} = \frac{1}{300}$$

$$\text{term of }\frac{z_0^2}{R^2}: \frac{1}{20}\times\left(\frac{1}{5}\right)^2 = \frac{1}{500}$$

In a high definition display having display pixels comprising 1,000 rows×1,000 columns or more, it is desirable to make the deflection focus calculated in terms of equation ①④' 1/1,000 or less. Because it is necessary to make the magnitude of equation ①④' 1/1,000 or less in order to make the spot size equivalent to approximately one pixel.

In actuality, however, defocus which was approximately four times as large as target value was generated. Magnitude of $|Z_0|$ in the foregoing description increases with an increase in beam current of the electron gun by nature. Especially in a bright screen, therefore, a phenomenon of significant defocus was observed.

The horizontal deflection magnetic field has heretofore been described. In the same way, however, nonuniformity of the vertical deflection magnetic field also becomes a main cause of defocus.

It is now assumed that winding distribution of the vertical deflection coil is represented by the following equation corresponding to equation ①'.

$$n(\alpha) = \text{Real }\Sigma b_n e^{jn\alpha}$$

where $b_1$ is generally a pure imaginary number.

Rewriting the amount of aberration with respect to half screen width represented by equation ①④' so that influence of $b_2$, $b_3$ and so on in the equation of $n(\alpha)$ may be included, we get $$\frac{\Delta H_{av}(Z_0)}{H_M} = \frac{a_2 I_x + b_2 I_y}{a_1 I_M}\cdot\frac{z_0}{R} +$$

$$\frac{a_3 I_x + b_3 I_y}{a_1 I_M}\cdot\frac{2z_1 z_0}{3R^2} + \frac{a_3 I_x + b_3 I_y}{a_1 I_M}\cdot\frac{z_0^2}{R^2} + \dots \quad 15'$$

where $I_x$ = horizontal deflection current
$I_y$ = vertical deflection current
$Z_0$ = expansion coordinates of electron beam within deflection magnetic field
$a_1 I_M$ = corresponding to half screen with
$R$ = radius of neck
$Z_1$ = deflection amount of electron beam center at terminus of deflection section The first and second lines of the right side of equation ①⑤' represent astigmatism proportionate to the spot expansion $|Z_0|$. The first line is proportionate to linear function of $I_x$ and $I_y$, whereas the second line is proportionate to quadratic function of $I_x$ and $I_y$. Because $Z_1$ in the second line includes a term proportionate to $I_x$ and $I_y$. The third line represents aberration proportionate to $|Z_0|^2$ and is proportionate to the linear function of $I_x$ and $I_y$.

The reason why these aberrations can be compensated by the configuration of the embodiment of FIG. 11 will now be described.

$I_x/I_M$ and $I_y/I_M$ in equation ①⑤' respectively correspond to sawtooth waves X and Y of FIG. 11.

Further, the real part of $\overline{Z}_1/R$ in equation ①⑤' is in order of approximately 0.5 at the right end portion of the screen as already described. Therefore, we get $$\frac{z_1}{R} \approx \frac{X - jY}{2}$$

Substituting these relations into equation ①⑤', it can be rewritten as $$\Delta H_{av}(Z_0) \approx j a_1 I_M\left(A_2\frac{Z_0}{R} + A_3\left(\frac{Z_0}{R}\right)^2 + \dots\right) \quad 16'$$

where $$A_2 = \frac{a_2 X + b_2 Y}{a_1} + \frac{a_3 X + b_3 Y}{3 a_1}$$

$$A_3 = \frac{a_2 X + b_3 Y}{a_1}$$

Referring to FIGS. 23, 24A, 24B and 24C, aberrations to be compensated by winding 118, 119 and 123 correspond to the real part of $A_2$, the imaginary part of $A_2$ and the real part of $A_3$ in equation ①⑥', respectively. Because the 2n-pole magnetic field component is proportionate to $(\overline{Z})^{n-1}$ as described around equation ⑤'. In the auxiliary deflection coil portion of coil 88 as shown in FIG. 23, the electron beam is deflected only slightly, and hence it can be regarded that $Z \approx Z_0$.

Therefore, coefficients of the quadratic function signal generating circuits 112 and 113 of FIG. 23, i.e., $k_1$ to $k_6$ appearing in equation $$k_1 X^2 + k_2 XY + k_3 Y^2 + k_4 X + k_5 Y + k_6$$

correspond to the real part and imaginary part of $A_2$ of equation ①⑥', respectively.

Therefore, the quadratic function generating sections 112 and 113 of FIG. 23 are so configured that the values of the coefficients $k_1$ to $k_6$ may be variably set. Terms such as $X^2$, $XY$ and $Y^2$ can be generated by using well-known ICs for multiplying circuit (such as commercially available MC1495 produced by Motorola). Further, it is a matter of course that these quadratic function generating circuits can be replaced by digital memories. By using the digital memory technique, it is possible to store and generate arbitrary functions of X and Y. As understood from the already described physics of defocus, the required main correction element has a quadratic function form.

Magnitude of magnetic field energy required for defocus correction will now be described.

As well known, magnetic field energy per unit volume is $\mu_0 H^2$ and hence proportionate to $H^2$. Denoting by $E_M$ magnetic field energy required for half screen width deflection and denoting by $\Delta E$ energy for defocus correction, we get $$\frac{\Delta E}{E_M} = \frac{l_2 \int a_1^2 I_M^2 \left\{ \left| A_2 \frac{Z_0}{R} + A_3 \left(\frac{Z_0}{R}\right)^2 + \ldots \right| \right\}^2 dS}{l_1 \int a_1^2 I_M^2 dS} \quad 17'$$

In this equation, dS denotes differential of cross section area of the neck in the magnetic field section of the auxiliary deflection coil. Further, $l_1$ denotes length of the magnetic field section of the main deflection coil, and $l_2$ denotes length of the magnetic field section of the auxiliary deflection coil. Since $l_1 \approx l_2$, this term is omitted in the following description.

Since the radius measured from the center of the neck is $|\bar{Z}_0|$, differential of area dS can be expressed as $$dS = \pi d(|\bar{Z}_0|^2)$$

Substituting this equation into equation 17' and executing integration, we get $$\frac{\Delta E}{E_M} = \frac{|A_2|^2 \frac{\pi R^4}{2R^2} + |A_3|^2 \frac{\pi R^6}{3R^4} + \ldots}{\pi R^2} \quad 18'$$

$$= \frac{|A_2|^2}{2} + \frac{|A_3|^2}{3} + \ldots$$

In this equation, the term of $A_2 A_3$ has been eliminated because $Z_0$, $Z_0^2$, $Z_0^3$ and so on form orthogonal function systems relative to each other. Therefore, little crosstalk is generated among windings 118, 119 and 123 shown in FIG. 23.

As understood from equation ①⑥', values such as $A_2$ and $A_3$ are maximized nearly at diagonal corners ($X=\pm 1$, $Y=\pm 1$) of the screen.

Concrete examples will now be described. (Refer to equations ①⑥' and ①⑧'.) When $a_2/a_1 = 1/100$ and $0 = b_2 = a_3 = b_3$, $$\frac{\Delta E}{E_M} = \frac{\left(\frac{a_2}{a_1}\right)^2}{2} = \frac{1}{20000}$$

When $a_3/a_1 = 1/20$ and $0 = a_2 = b_2 = b_3$, $$\frac{\Delta E}{E_M} = \frac{\left(\frac{a_3}{3a_1}\right)^2}{2} = \frac{\left(\frac{a_3}{a_1}\right)^2}{3}$$

$$= \frac{1}{7200} = \frac{1}{1200}$$

That is to say, it is known that the energy required for defocus correction is as minute as approximately 1/1000 of the horizontal deflection energy. As a result, defocus can be efficiently compensated with minute power.

As already described with reference to equation ①④', the term of $Z_1 Z_0$ in equation ①④' especially becomes a main cause of defocus. The energy required to correct this corresponds to the term of 1,7200 shown above. Correspondence relations are summarized in the following table.

|  | Amount of defocus | Necessary energy |
|---|---|---|
| Term of Z0 | 1/500 | 1/20,000 |
| Term of Z0Z1 | 1/300 | 1/7,200 |
| Term of Z02 | 1/500 | 1/1,200 |

As already described, the 6-pole magnetic field of the winding 123 shown in FIG. 24C is required to correct the last term of $Z_0^2$ shown in the above table. The amount of defocus caused by the term of $Z_0^2$ is relatively small. Depending upon application, therefore, this compensation can be omitted.

However, the term corresponding to $Z_0 Z_1$ is a main term included in causes of defocus. Correction of this term is indispensable. Returning to equation ①⑥', $HH_{av}(Z_0)$ under the condition that $$\frac{a_3}{a_1} = \frac{1}{20} \text{ and } 0 = a_2 = b_2 = b_3$$

can be derived as $$H_{av}(Z_0) = ja_1 I_M \frac{X}{60} (X - jY) \frac{Z_0}{R} \quad 19'$$

$$= ja_1 I_M \frac{X^2}{60} \cdot \frac{Z_0}{R} + a_1 I_M \frac{XY}{60} \cdot \frac{Z_0}{R}$$

Figure 24A:
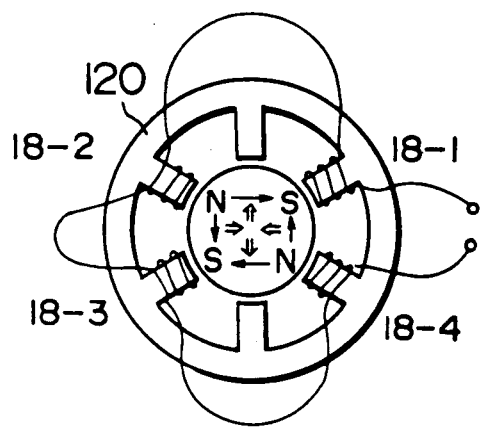
FIGS. 24A to 24C are configuration diagrams showing other embodiments of the aberration correcting coil.
Figure 24B:
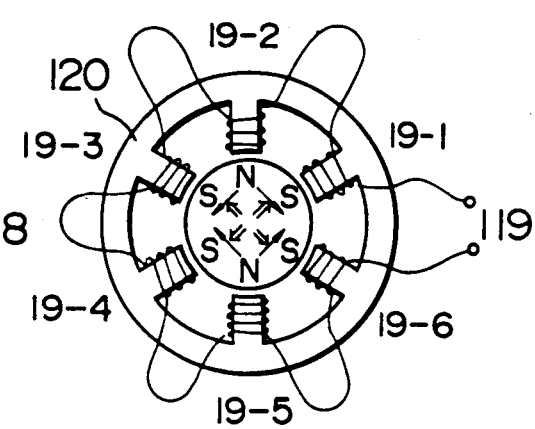
Figure 24C:
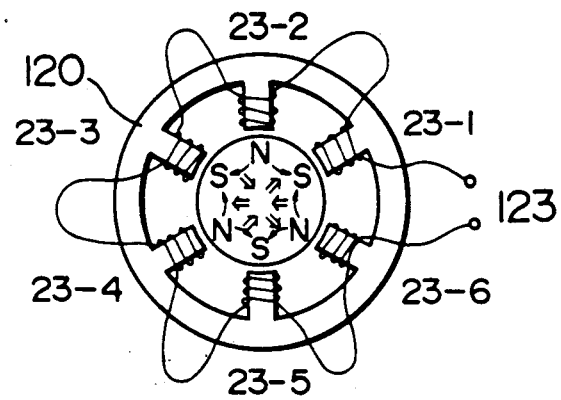

The first term (term of $X_2$) of the right side of equation ①⑨' corresponds to the 4-pole magnetic field of the winding 118 shown in FIG. 24A, whereas the second term (term of XY) of the right side corresponds to the 4-pole magnetic field of the winding 119 of FIG. 24B. Currents flow through respective winding should have a parabolic waveform of $X_2$ and a butterfly waveform of XY, respectively.

Recently in a field different from that of a projection display whereto the present invention relates, i.e., in the field of direct-view type, it has been begun to let flow a sum current of parabolic waveform signals having a form of $(X^2 + Y^2)$ through the winding 118 of FIG. 24A to correct astigmatism. In this technique, aberration peculiar to a display having three electron guns disposed in line is corrected, and the term of XY is not included. As described above, it has been made clear by the above described analysis that it is indispensable in a projection display to correct the term of Xy as well in addition to the term of $X^2$.

Figure 25:
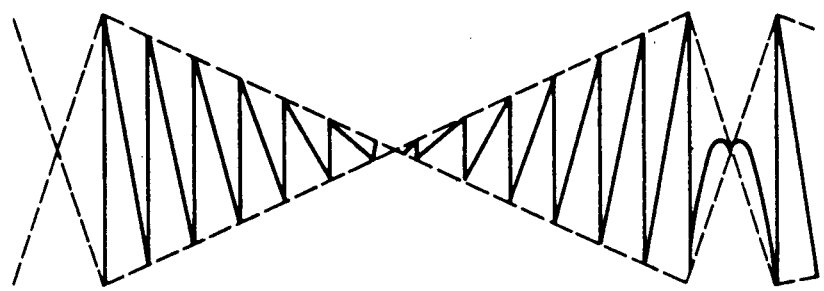
FIG. 25 is a graph showing a butterfly waveform.

FIG. 25 shows a butterfly waveform (waveform of XY), which has a shape basically different from that of the parabolic waveform as evident from FIG. 25.

Defocus caused by the real part of $A_3$ in equation ①⑥' can be corrected by the magnetic field of the winding 123 shown in FIG. 24C. However, the imaginary part of $A_3$ cannot be corrected. The real part of $A_3$ is typically generated by deviation of the winding distribution of the main horizontal deflection coil. The imaginary part of $A_3$ is typically generated by deviation of the winding distribution of the main vertical deflection coil. It can be considered that the magnitude of the imaginary part is approximately half or less of the magnitude of the real part of $A_3$. Because the horizontal coil is wound inside along the CRT neck in the practical structure of the main deflection coil 3 and hence has small value of R in equation ①⑥', whereas the vertical coil is wound outside and hence has an R value which is as large as approximately $\sqrt{2}$ times that of the horizontal coil. As evident from equation ①⑥', influence of $A_3$ upon defocus is proportional to $1/R_2$. Therefore, influence of the imaginary part of $A_3$ is half of that of its real part and can be nearly neglected.

Finally, the pole piece on which the auxiliary deflection coil and the aberration correcting coil according to the present invention are wound need not necessarily have 6 poles as represented by 120 of FIGS. 24A to 24C. Instead, a toroidal core as shown in FIG. 20 may be used. In FIG. 20, numeral 124 denotes a toroidal core. Although a toroidal winding is shown in FIG. 20, a saddle-like winding may be used instead.

Further, the quadratic function generating circuits 112 and 113 of FIG. 23 may have the same form as that of the well-known so-called digital convergence circuit in which a desired waveform is stored beforehand in a digital memory.

Finally, supposing the following application, examples of concrete numerical values of respective windings of FIGS. 24A to 24C as well as 26A and 26B will now be shown.

Figure 26A:
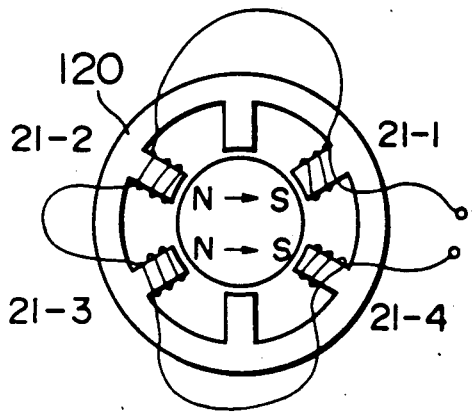
FIGS. 26A and 26B are configuration diagrams showing other embodiments of the aberration correcting coil.
Figure 26B:
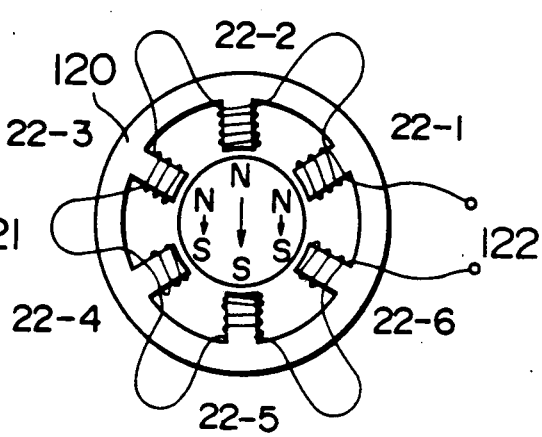

Application
    Horizontal frequency: 64 kHz
    Vertical frequency: 60 kHz
    Number of pixels: 1,280 dots × 1,024 lines Examples of Numerical values Case of FIGS. 26A and 26B
    Winding 121 ($L \approx 32$ μH)
        21-1:25T
        21-2:25T
        21-3:25T
        21-4:25T
    Winding 122 ($L \approx 32$ μH)
        22-1:14T
        22-2:28T
        22-3:14T
        22-4:14T
        22-5:28T
        22-6:14T These windings are driven by a B-class push-pull amplifier (corresponding to the output section of the auxiliary deflection circuit 89 of FIG. 23) supplied with power from ±24 V.

Case of FIGS. 24A to 24C
    Winding 118 ($L \approx 4$ μH)
        18-1:12T
        18-2:12T
        18-3:12T
        18-4:12T
    Winding 119 ($L \approx 4$ μH)
        19-1:7T
        19-2:14T
        19-3:7T
        19-4:7T
        19-5:14T
        19-6:7T
    Winding 123 ($L \approx 3$ μH)
        23-1:7T
        23-2:7T
        23-3:7T
        23-4:7T
        23-5:7T
        23-6:7T These windings are driven by a B-class push-pull amplifier (i.e., output section of negative feedback amplifiers 12 and 16 of FIGS. 4A and 4B) supplied with power from ±5 V.

(1) As heretofore described, the present invention makes it possible to significantly reduce defocus troubles of a CRT of the electromagnetic focusing type caused by dispersion in attachment dimensions of an electron gun. Especially in application to projection display apparatuses, the adjustment processing which has been extremely difficult in the prior art can be facilitated and quickened.

(2) The multi-pole core having 6 to 8 poles required for implementation of the present invention can also be used as the core of the auxiliary deflection coil or the core of the main deflection coil, resulting in an inexpensive cost.

(3) Even in a display for which high-degree focus performance is demanded, pincushion distortion is corrected by inexpensive magnet means and, in addition, defocus caused by magnets can be corrected by two sets of 4-pole focus coil means.

As a result, a focus adjusting device having excellent function and cleared of drawbacks of the prior art can be provided.

We claim:

1. A focus adjusting device for a CRT in a projection display, comprising:
    deflection coil means;
    6-pole pole piece means disposed at a position preceding the deflection coil means with respect to a direction of electron propagation;
    main focus coil means disposed at a position preceding the 6-pole pole piece means with respect to the direction of electron propagation;
    auxiliary deflection winding means disposed on the 6-pole pole piece means;
    two astigmatic aberration cancellation winding means disposed on the 6-pole pole piece means for cancelling astigmatic aberration caused by the main focus coil means, wherein one of the two astigmatic aberration cancellation winding means produces a magnetic field having six magnetic poles, an angle between adjacent ones of the six magnetic poles being approximately 60°; and
    current adjusting means for adjusting currents in the two astigmatic aberration cancellation winding means so as to effect cancellation of the astigmatic aberration caused by the main focus coil means.

2. A focus adjusting device according to claim 1, further comprising:
    magnet means, having a plurality of magnetic poles, disposed at a position following the deflection coil means with respect to the direction of electron propagation for generating a constant magnetic field;
    wherein the deflection coil means comprises winding means having a winding distribution for increasing pincushion distortion and for enabling cancellation of astigmatic aberration caused by the magnet means.

3. A focus adjusting device according to claim 2, wherein the magnet means enables cancellation of pincushion distortion.

4. A focus adjusting device according to claim 2, wherein the magnet means comprises electromagnet means.

5. A focus adjusting device according to claim 2, wherein the magnet means has one of 8 and 4 magnetic poles.

6. A focus adjusting device for a CRT in a projection display according to claim 1, wherein the projection display produces three color images, and wherein the auxiliary deflection winding means enables correction of a color shift between the three color images.

7. A focus adjusting device according to claim 1, wherein the auxiliary deflection winding means comprises:
 a first auxiliary deflection winding disposed on 4 poles of the 6-pole pole piece means such that when a current flows in the first auxiliary deflection winding, a first 2 adjacent poles of the 4 poles generate respective first magnetic poles, and a second 2 adjacent poles of the 4 poles generate respective second magnetic poles; and
 a second auxiliary deflection winding disposed on 6 poles of the 6-pole pole piece means such that when a current flows in the second auxiliary deflection winding, a first 3 adjacent poles of the 6 poles generate respective first magnetic poles, and a second 3 adjacent poles of the 6 poles generate respective second magnetic poles.

8. A focus adjusting device according to claim 1, wherein the two astigmatic aberration cancellation winding means comprise:
 a first astigmatic aberration cancellation winding disposed on 4 poles of the 6-pole pole piece means such that when a current flows in the first astigmatic aberration cancellation winding, a first 2 diagonally disposed poles of the 4 poles generate respective first magnetic poles, and a second 2 diagonally disposed poles of the 4 poles generate respective second magnetic poles; and
 a second astigmatic aberration cancellation winding disposed on 6 poles of the 6-pole pole piece means such that when a current flows in the second astigmatic aberration cancellation winding, a first 2 diagonally disposed poles of the 6 poles generate respective first magnetic poles, a second 2 diagonally disposed poles of the 6 poles generate respective second magnetic poles, and a third 2 diagonally disposed poles of the 6 poles generate respective second magnetic poles.

9. A focus adjusting device for a CRT in a display, comprising:
 magnet means, having a plurality of magnetic poles, for generating a constant magnetic field; and
 deflection coil means disposed at a position preceding the magnet means with respect to a direction of electron propagation, wherein the deflection coil means comprises winding means having a winding distribution for increasing pincushion distortion and for enabling cancellation of astigmatic aberration caused by the magnet means.

10. A focus adjusting device according to claim 9, wherein the magnet means enables cancellation of pincushion distortion.

11. A focus adjusting device according to claim 9, wherein the magnet means comprises electromagnet means.

12. A focus adjusting device according to claim 9, wherein the magnet means has one of 8 and 4 magnetic poles.

* * * * *